US011980858B2

(12) United States Patent
Saar et al.

(10) Patent No.: US 11,980,858 B2
(45) Date of Patent: May 14, 2024

(54) CAPSULE, DEVICE AND METHOD FOR MIXING MULTIPLE SUBSTANCES

(71) Applicant: Capsulab Ltd, Ramat Gan (IL)

(72) Inventors: Gal Saar, Shoham (IL); Dov Meirzon, Even-Yehuda (IL)

(73) Assignee: Capsulab Ltd, Ramat Gan (IL)

( * ) Notice: Subject to any disclaimer, the term of this patent is extended or adjusted under 35 U.S.C. 154(b) by 0 days.

(21) Appl. No.: 17/295,564

(22) PCT Filed: Nov. 22, 2019

(86) PCT No.: PCT/IL2019/051276
§ 371 (c)(1),
(2) Date: May 20, 2021

(87) PCT Pub. No.: WO2020/105053
PCT Pub. Date: May 28, 2020

(65) Prior Publication Data

US 2021/0354099 A1 Nov. 18, 2021

Related U.S. Application Data

(60) Provisional application No. 62/770,775, filed on Nov. 22, 2018.

(51) Int. Cl.
*B01F 7/16* (2006.01)
*B01F 13/10* (2006.01)
(Continued)

(52) U.S. Cl.
CPC ............ *B01F 27/88* (2022.01); *B01F 33/841* (2022.01); *B01F 35/7137* (2022.01);
(Continued)

(58) Field of Classification Search
CPC .............. B01F 15/0226; B01F 15/0237; B01F 15/0279; B01F 33/841; B01F 33/84;
(Continued)

(56) References Cited

U.S. PATENT DOCUMENTS

D93,461 S 10/1934 De Vaulchier
3,373,906 A 3/1968 De Hart et al.
(Continued)

FOREIGN PATENT DOCUMENTS

CH 705193 12/2012
CN 104816888 8/2015
(Continued)

OTHER PUBLICATIONS

International Preliminary Report on Patentability dated Jun. 3, 2021 From the International Bureau of WIPO Re. Application No. PCT/IL2019/051276. (10 Pages).
(Continued)

*Primary Examiner* — Elizabeth Insler

(57) ABSTRACT

A capsule for mixing multiple substances, comprising: a main chamber having a main chamber bottom and a main chamber top opening; at least two repository tubular chambers, each: adapted to contain substance, mechanically connected to the main chamber and having a repository tubular chamber top opening; at least two passages, each fluidly connecting one of the at least two repository tubular chambers to the main chamber; a main piston fitted in the main chamber; and a mixer rod having a mixer element disposed at a distal end and a torque adapter disposed at a proximal end for transferring a torque to the mixer element, the mixer rod is fitted to pass along the main piston such that the mixer element is mounted in the main chamber between the main chamber bottom and a distal end of the main piston when the main piston is in the outward position.

10 Claims, 34 Drawing Sheets

(51) Int. Cl.

| | |
|---|---|
| ***B01F 15/02*** | (2006.01) |
| ***B01F 15/06*** | (2006.01) |
| ***B01F 27/88*** | (2022.01) |
| ***B01F 33/841*** | (2022.01) |
| ***B01F 35/71*** | (2022.01) |
| ***B01F 35/75*** | (2022.01) |
| ***B01F 35/95*** | (2022.01) |
| *B01F 35/90* | (2022.01) |
| *B01F 101/21* | (2022.01) |

(52) U.S. Cl.
CPC ...... *B01F 35/7164* (2022.01); *B01F 35/7174* (2022.01); *B01F 35/754251* (2022.01); *B01F 35/95* (2022.01); *B01F 2035/99* (2022.01); *B01F 2101/21* (2022.01)

(58) Field of Classification Search
CPC .......... B01F 35/717613; B01F 2101/20; B01F 35/7164; B65D 51/28; B05C 17/00566
See application file for complete search history.

(56) References Cited

U.S. PATENT DOCUMENTS

| | | | | |
|---|---|---|---|---|
| 3,815,878 | A | 6/1974 | Baskas et al. | |
| D234,026 | S | 12/1974 | Winter | |
| D265,166 | S | 6/1982 | Ernest et al. | |
| 4,755,060 | A | 7/1988 | Pedersen | |
| 4,889,432 | A * | 12/1989 | Patterson | A61C 9/0026 366/139 |
| 5,092,492 | A | 3/1992 | Centea | |
| 5,558,283 | A | 9/1996 | Fisher et al. | |
| D393,420 | S | 4/1998 | Hsu | |
| 6,105,822 | A | 8/2000 | Larsen et al. | |
| 6,293,693 | B1 * | 9/2001 | Rodgers | B01F 3/10 366/189 |
| 6,402,364 | B1 * | 6/2002 | Esclar | B01F 31/441 366/276 |
| 6,527,431 | B2 | 3/2003 | Chen et al. | |
| D482,276 | S | 11/2003 | Wang | |
| D487,165 | S | 2/2004 | Hammond et al. | |
| D502,096 | S | 2/2005 | Wilcock et al. | |
| D570,636 | S | 6/2008 | Kulujian et al. | |
| 7,524,103 | B2 | 4/2009 | McGill et al. | |
| D682,087 | S | 5/2013 | Bourguignon | |
| 8,851,740 | B1 | 10/2014 | Mills et al. | |
| 9,242,772 | B1 | 1/2016 | Anderson et al. | |
| D748,977 | S | 2/2016 | Doria | |
| D771,434 | S | 11/2016 | Burrows | |
| D782,694 | S | 3/2017 | Wainwright et al. | |
| 9,592,321 | B2 * | 3/2017 | Anderson | B01F 25/4512 |
| D815,752 | S | 4/2018 | Jackson et al. | |
| 10,010,362 | B2 * | 7/2018 | Vogt | B01F 35/7139 |
| D883,781 | S | 5/2020 | Nechita | |
| D896,021 | S | 9/2020 | Bond et al. | |
| D899,244 | S | 10/2020 | Lee et al. | |
| 2006/0000852 | A1 * | 1/2006 | Manne | A45D 44/00 222/145.6 |
| 2006/0007781 | A1 | 1/2006 | Martin et al. | |
| 2006/0227653 | A1 | 10/2006 | Keller | |
| 2010/0054075 | A1 | 3/2010 | Valaie | |
| 2011/0186668 | A1 | 8/2011 | Seidler et al. | |
| 2012/0116301 | A1 | 5/2012 | Faccioli et al. | |
| 2013/0168413 | A1 | 7/2013 | Bodct et al. | |
| 2013/0344221 | A1 | 12/2013 | Farrell et al. | |
| 2016/0016134 | A1 | 1/2016 | Smith et al. | |
| 2016/0038209 | A1 | 2/2016 | Grebius et al. | |
| 2016/0167989 | A1 | 6/2016 | Yoon et al. | |
| 2016/0317984 | A1 | 11/2016 | Armstrong et al. | |
| 2016/0324368 | A1 | 11/2016 | Seidler et al. | |
| 2017/0327296 | A1 | 11/2017 | Ettlin et al. | |
| 2019/0374067 | A1 | 12/2019 | Duffy et al. | |
| 2023/0241567 | A1 | 8/2023 | Mccrzon et al. | |

FOREIGN PATENT DOCUMENTS

| | | |
|---|---|---|
| EP | 1044720 | 10/2000 |
| EP | 2974711 | 1/2016 |
| JP | 2000-313487 | 11/2000 |
| KR | 10-1985-0002039 | 5/1985 |
| KR | 10-1299849 | 9/2013 |
| KR | 10-2014-0050346 | 4/2014 |
| WO | WO 2005/018830 | 3/2005 |
| WO | WO 2010/022331 | 2/2010 |
| WO | WO 2014/061989 | 4/2014 |
| WO | WO 2019/023805 | 2/2019 |
| WO | WO 2020/105053 | 5/2020 |
| WO | WO 2021/240530 | 12/2021 |
| WO | WO 2023/084527 | 5/2023 |

OTHER PUBLICATIONS

International Search Report and the Written Opinion dated Nov. 17, 2021 From the International Searching Authority Re. Application No. PCT/IL2021/050635 (37 Pages).
Invitation to Pay Additional Fees, Communication Relating to the Result of the Partial International Search and the Provisional Opinion dated Sep. 14, 2021 From the International Searching Authority Re. Application No. PCT/IL2021/050635. (9 Pages).
Office Action dated Nov. 10, 2021 From the Israel Patent Office Re. Application No. 283348 and Its Translation Into English. (5 Pages).
Examination Report dated Jun. 4, 2020 From the European Union Intellectual Property Office, EUIPO Re. Application No. 007960034-001/004. (7 Pages).
International Search Report and the Written Opinion dated Feb. 21, 2020 From the International Searching Authority Re. Application No. PCT/IL2019/051276. (16 Pages).
Notification of Amendment dated Dec. 3, 2020 From the State Intellectual Property Office of the People's Republic of China Re. Application No. 202030237017.5. (16 Pages).
Notification of Office Action dated Sep. 16, 2020 From the State Intellectual Property Office of the People's Republic of China Re. Application No. 202030237138.X. (1 Page).
Official Action dated Nov. 20, 2020 From the US Patent and Trademark Office Re. U.S. Appl. No. 29/714,307. (14 Pages).
Restriction Official Action dated Nov. 20, 2020 From the US Patent and Trademark Office Re. U.S. Appl. No. 29/714,305. (14 Pages).
Absolution "Mix & Match", Absolution Cosmetics, Product Description, 45 P., May 31, 2012.
Alibaba "Smart Touch Screen Bean to Cup WiFi Vending Coffee Machine for Cafe Bakery Saeco", Alibaba, Product Information, p. 1-10, Nov. 6, 2020.
Amazon "2" Empty Acom Capsules—2AEC—100 Empty Capsules, Amazon, 8 P., First Available Apr. 18, 2011.
Amazon "Amazon Brand—100 Ct. Solimo Dark Roast Coffee Pods, Compatible With Keurig 2.0 K-Cup Brewers", Amazon, 11 P., First Available Jun. 24, 2019.
Amazon "SHARDOR Drip Coffee Maker, Touch-Screen Programmable Coffee Machine, Automatic Start and Shut Off, Brew Strength Control, Warming Plate, 50.72oz(1.5L)", Amazon, p. 1-12, Aug. 4, 2020.
Beautylicieuse "Teint Particulier Lancôme, un Fond de Teint Sur-Mesure?", Beautylicieuse, Product Description, 14 P., Oct. 17, 2017.
DiyaCare "Do-It-Yourself, Custom-Made-Preparations Machine & Capsule", DiyaCare, IP Document, Version 0.7, 47 pages, Aug. 2018.
DSM "Vitamin Stability—Vitamin Basics—Compendium", DSM in Animal Nutrition & Health, 11 P., 1994.
Emuage "Personalized Cosmetics: Your Customised Cosmetic Products, Freshly Prepared at Home in A Couple of Minutes", Emuage, Product Description, 11 P., Dec. 2018.
Halver "The Vitamins: 1. Water-Soluble Vitamins", FAO, Chap.6: 1-35, Jan. 1980.
Peter "Stability of Antioxidants in Cosmetic Products", The Beauty Brains Forum, 9 P., Oct. 2016.

(56) References Cited

OTHER PUBLICATIONS

QueensPack "Personal Care Containers", Queens Packaging, 2 P., 2014.
Romy "Les Cures Fraîches: La Boutique Romy Pour l'Achat de Votre Soin", Romy Paris, 9. P., 2011.
Romy "Romy, Skin Cares Adapted to Your Daily Life", Romy Paris, Product Description, 11 P., 2018.
Saminathan "Pharmaceutical Incompatibility. Physical and Chemical Incompatibility", Allianze College of Medical Sciences, 23 pages, Feb. 19, 2010.
Sheraz et al. "Stability and Stabilization of Ascorbic Acid—A Review", Household and Personal Care Today, H&PC Today, 10(3): 22-25, May/Jun. 2015.
Twitter "Batsam KSA", Twitter, 2 P., First Available Jul. 20, 2018.
Walmart "KINGMMICRO4: Universal Reusable K-Cup Pod Coffee Filter, Compatible With All 2.0 Keurig K-Cup Pod Coffee Makers, 1 Count, Black", Walmart, 7 P., First Available Nov. 5, 2020.
WebstaurantStore "Avantco C10 12 Cup Pourover Commercial Coffee Maker With 2 Warmers—120V", WebstaruantStore, Product Description, Item #: 177C10, p. 1- 15, Apr. 12, 2010.
YouTube "Absolution—How to Mix and Match?", Jollie Beauty, YouTube, Video, Mar. 16, 2018.
YouTube "Color Whip Electric Color Mixer", YouTube, Video, May 15, 2013.
YouTube "Emuage Cosmetics Machine", YouTube, 6 P., Jan. 7, 2018.
YouTube "Women Find Their Perfect Foundation", YouTube, Video, Aug. 5, 2017.
ZJchao "Electric Hair Cream Mixer, Hair Salon Coloring Bowl, Automatic Barber Hair Dyeing Kit DIY Tools", Amazon, 7 P., Jan. 2018.
Examination Report Under Sections 12 & 13 of the Patents Act, 1970 and the Patents Rules, 2003 dated Mar. 24, 2022 From the Government of India, Intellectual Property India, Patents, Designs, Trade Marks, Geographical Indications, The Patent Office Re. Application No. 358639-001. (11 Pages).
Invitation to Correct Ceertain Irregularities Affecting an Application for International Registration dated Feb. 22, 2022 From the WIPO Hague, The International Design System Re. Application No. 970123234. (3 Pages).
International Search Report and the Written Opinion dated Aug. 29, 2022 From the International Searching Authority Re. Application No. PCT/IL2022/050320. (9 Pages).
Communication Pursuant to Article 94(3) EPC dated Dec. 1, 2022 From the European Patent Office Re. Application No. 19817819.6. (3 pages).
Translation Dated Oct. 31, 2022 of Notification of Office Action dated Oct. 9, 2022 From the State Intellectual Property Office of the People's Republic of China Re Application No. 201980089916.X. (6 Pages).
International Preliminary Report on Patentability dated Dec. 8, 2022 From the International Bureau of WIPO Re. Application No. PCT/IL2021/050635. (12 Pages).
Notification of Office Action and Search Report dated Oct. 9, 2022 From the State intellectual Property Office of the People's Republic of China Re Application No. 201980089916.X and its Summary in English. (10 Pages).
Notice of Reason(s) for Rejection dated Sep. 5, 2023 From the Japan Patent Office Re. Application No. 2021-528886 and Its Translation Into English. (10 Pages).
Notice of Amendment dated Jun. 12, 2023 From the State Intellectual Property Office of the People's Republic of China Re. Application No. 202230074897.8 and Its Translation Into English. (5 Pages).
Hague Agreement Concerning the International Registration of Industrial Design—Notification of Refusal—Rule 18(2) of the Common Regulations dated Mar. 31, 2023 From the International Bureau of the World Intellectual Property Organization, WIPO Re. Application No. 2022-500299. (17 Pages).
International Search Report and the Written Opinion dated Mar. 14, 2023 From the International Searching Authority Re. Application No. PCT/IL2022/051215 (14 Pages).
Translation Dated Jul. 4, 2023 of Notification of Office Action dated Jun. 14, 2023 From the State Intellectual Property Office of the People's Republic of China Re. Application No. 201980089916.X. (7 pages).
Notification of Office Action dated Jun. 14, 2023 From the State Intellectual Property Office of the People's Republic of China Re. Application No. 201980089916.X. (7 Pages).
Notice of Amendment dated Jun. 9, 2023 From the State Intellectual Property Office of the People's Republic of China Re. Application No. 202230074795.6 and Its Translation Into English. (3 Pages).
Notification of Refusal dated Jun. 21, 2023 From the Geneva Act of the Hague Agreement Concerning the International Registration of Industrial Designs Re. Issuing No. 9-5-2023-056533373. (3 Pages).
International Preliminary Report on Patentability dated Oct. 5, 2023 From the International Bureau of WIPO Re. Application No. PCT/IL2022/050320 (6 Pages).
Decision on Rejection dated Nov. 17, 2023 From the State Intellectual Property Office of the People's Republic of China Re. Application No. 201980089916.X. (7 Pages).
Notice of Amendment dated Nov. 17, 2023 From the State Intellectual Property Office of the People's Republic of China Re. Application No. 202230074897.8 and Its Translation Into English. (4 Pages).
Notice of Amendment dated Dec. 4, 2023 From the State Intellectual Property Office of the People's Republic of China Re. Application No. 202230074795.6 and Its Summary in English. (4 Pages).
Notification of Refusal dated Dec. 11, 2023 From the International Bureau of the World Intellectual Property Organization, WIPO, Re. International Registration No. DM/219621. (4 Pages).
Translation Dated Dec. 12, 2023 of Decision on Rejection dated Nov. 17, 2023 From the State Intellectual Property Office of the People's Republic of China Rc. Application No. 201980089916.X. (8 Pages).
Grounds of Reason of Rejection Dated Jan. 22, 2024 From the Korean Intellectual Property Office Re. Application No. 10-2021-7019283 and Its Translation Into English. (15 Pages).

* cited by examiner

100

CAPSULE, DEVICE AND METHOD FOR MIXING MULTIPLE SUBSTANCES

RELATED APPLICATIONS

This application is a National Phase of PCT Patent Application No. PCT/IL2019/051276 having International filing date of Nov. 22, 2019, which claims the benefit of priority under 35 USC § 119(e) of U.S. Provisional Patent Application No. 62/770,775 filed on Nov. 22, 2018. The contents of the above applications are all incorporated by reference as if fully set forth herein in their entirety.

FIELD AND BACKGROUND OF THE INVENTION

The present invention, in some embodiments thereof, relates to capsule, device and method for mixing multiple substances and, more particularly, but not exclusively, to a selecting, mixing and preparing substances by consumers.

In recent years, consumers of toiletries, personal care, food additives, nutritional supplements and pharma, are expressing a growing need for custom-made, personalized, modular and/or do-it-yourself preparations of ingredients.

Existing solutions provide some devices and/or services for selecting, mixing and/or preparing ingredients into a preparation, mostly for use by specialists.

SUMMARY OF THE INVENTION

According to an aspect of some embodiments of the present invention there is provided a capsule for mixing multiple substances, comprising: a main chamber having a main chamber bottom and a main chamber top opening; at least two repository tubular chambers, each: (1) adapted to contain substance, (2) mechanically connected to the main chamber and (3) having a repository tubular chamber top opening; at least two passages, each fluidly connecting one of the at least two repository tubular chambers to the main chamber; a main piston fitted in the main chamber; and a mixer rod having a mixer element disposed at a distal end and a torque adapter disposed at a proximal end for transferring a torque to the mixer element, the mixer rod is fitted to pass along the main piston such that the mixer element is mounted in the main chamber between the main chamber bottom and a distal end of the main piston when the main piston is in the outward position.

Optionally, the main piston is sealing the at least two passages in an inward position and opens the at least two passages when being moved along the main chamber to an outward position.

Optionally, the at least two repository tubular chambers are peripheral to the main chamber.

Optionally, the main chamber bottom includes a main chamber bottom opening sealed by a membrane, and the mixer rod includes a sharp tip at the distal end to puncture the membrane.

Optionally, the main chamber bottom includes a main chamber bottom opening sealed by a bottom piston, and the distal end of the mixer rod is adapted to push the bottom piston downward and partially open the main chamber bottom opening.

More optionally, the bottom piston is pushed downward to create a plurality of bottom channels of the main chamber bottom opening around the bottom piston.

Optionally, each of the at least two repository tubular outer openings is sealed by a repository tubular piston.

More optionally, each of the at least two repository tubular pistons is having a top surface which is pushed downward by one of at least two pushing rods, to extract a substance from a respective one of the at least two repository tubular chambers via a respective one of the at least two passages into the main chamber.

More optionally, each one of the at least two repository tubular chambers is comprising a spring which pushes a respective one of the at least two repository tubular pistons downward to extract a substance from the one of the at least two repository tubular chambers via a respective one of the at least two passages into the main chamber.

More optionally, the spring holds the respective one of the at least two repository tubular pistons at a downward position to prevent substance from entering into the one of the at least two repository tubular chambers from the main chamber.

More optionally, each one of the at least two repository tubular pistons is comprising at least one locking tooth which is inserted into a notch of a respective one of the at least two repository tubular chambers when the one of the at least two repository tubular pistons is at a downward position, to prevent substance from entering into the respective one of the at least two repository tubular chambers from the main chamber.

More optionally, at least one of the at least two repository tubular pistons is rotatable.

More optionally, the at least one of the at least two repository tubular pistons includes a propeller part for pushing powder through a respective of the at least two passages and a hollow disk part to prevent the powder from moving upward.

More optionally, at least one of the at least two repository tubular pistons includes at least one sharp tip to penetrate a substance bag located inside a respective at least one of the at least two repository tubular chambers.

Optionally, at least one of the at least two repository tubular chambers includes at least one sharp tip to penetrate a substance bag located inside the at least one of the at least two repository tubular chambers.

Optionally, the torque adapter is connected to an actuator which is pulling the mixer rod upward, so the mixer element is pushing the main piston upward to open the at least two passages.

Optionally, blades of the mixer element include heating surfaces, which are heating the substances in the main chamber.

Optionally, the main chamber bottom includes at least one bottom slot for locking the mixer element to release the torque adapter from a device.

According to an aspect of some embodiments of the present invention there is provided a device for mixing multiple substances in a capsule, comprising: a fixture for a single capsule; at least two pushing rods, each adapted to push a repository tubular piston into a repository tubular chamber of the single capsule to extract a substance into a main camber of the capsule; a torque element for holding a mixer rod of the capsule and adapted to rotate, pull and push the mixer rod along an axis of the mixer rod; and a controller adapted to identify a capsule in the fixture and control movements of the pushing rods and the torque arm sequentially during one mixing and delivering session.

Optionally, the device further comprises at least one motor operating the pushing rods and the torque element.

Optionally, the torque element is a torque arm having a clamp for holding the mixer rod.

More optionally, the clamp is adapted for grabbing and releasing a torque adapter disposed at a proximal end of the mixer rod.

Optionally, the torque element includes a torque piston which is inserted into a tube part of the mixer rod and locking the mixer rod by at least one pin included in the torque piston that are inserted into slots of the mixer rod.

Optionally, the plurality of pushing rods are separately controlled by the controller.

Optionally, the device further comprises at least one main pushing rod for pushing the main piston towards the main chamber bottom.

Optionally, the fixture is a tray having an open position wherein the capsule may be inserted and a closed position wherein the capsule is fixed.

According to an aspect of some embodiments of the present invention there is provided a method mixing multiple substances in a capsule, comprising: fixing a capsule to a mixer device, the capsule comprising a main chamber, at least two repository tubular chambers and at least two passages, each of the at least two passages is fluidly connecting one of the at least two repository tubular chambers to the main chamber; pulling a mixer rod of the capsule, the mixer rod is fitted to pass along a main piston fitted in the main chamber to seal the at least two passages in an inward position, thus moving the main piston along the main chamber to an outward position to open the at least two passages; and rotating the mixer rod to operate a mixer element mounted at a distal end of the mixer rod and located inside the inner chamber.

Optionally, the method further comprises, after the pulling: pushing at least two repository tubular pistons fitted in the at least two repository tubular chambers to extract substances from the at least two repository tubular chambers via a respective one of the at least two passages into an inner chamber of the main chamber sealed by the main piston.

Optionally, a substance from each of the at least two repository tubular chambers is pulled into the main chamber by movement of the main piston via the at least two passages.

Optionally, the method further comprises: while rotating the mixer rod, pulling and pushing the mixer rod to move the mixer element inside the inner chamber.

Optionally, the method further comprises: puncturing a membrane sealing a main chamber bottom opening in the main chamber bottom via a sharp tip disposed at the distal end of the mixer rod.

Optionally, the method further comprises: pushing a bottom piston sealing a main chamber bottom opening in the main chamber bottom via the distal end of the mixer rod to partially open the main chamber bottom opening.

Optionally, the method further comprises: pushing the main piston towards the main chamber bottom to extract mixed substances from a main chamber bottom opening in the main chamber bottom.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

Figure 1:
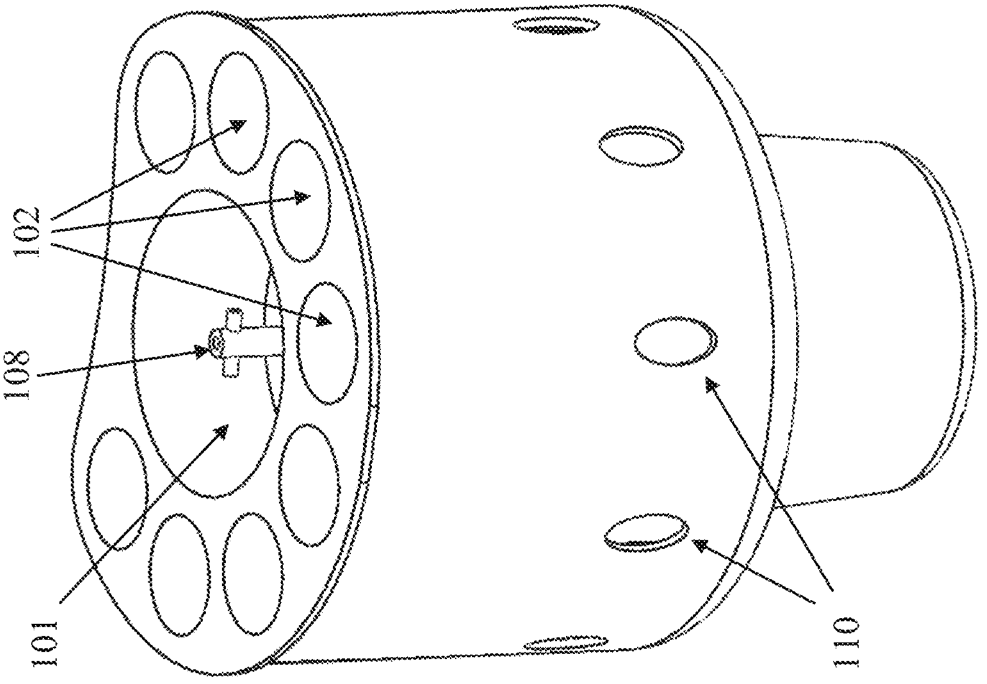
FIG. 1 is an illustration of a capsule for mixing multiple substances, according to some embodiments of the present invention.

The present invention, in some embodiments thereof, relates to capsule, device and method for mixing multiple substances and, more particularly, but not exclusively, to a selecting, mixing and preparing substances by consumers.

According to some embodiments of the present invention, there is provided a capsule for mixing multiple substances. The capsule includes a main chamber and repository tubular chambers (tubes), each containing a substance and sealed by a repository tubular piston. Passages are fluidly connecting each repository tubular chambers to the main chamber. These passages are optionally sealed by a main piston fitted in the main chamber. The capsule also includes a mixer rod having a mixer element disposed at a distal end and a torque adapter disposed at a proximal end. The torque adapter is transferring a torque to the mixer element. The mixer rod is fitted to pass along the main piston such that the mixer element is mounted in an inner chamber of the main chamber sealed by the main piston.

The capsule is fixed to a mixing device. A torque arm of the device, having a clamp for holding a mixer rod, is pulling the mixer rod thus moving the main piston along the main chamber to an outward position to open the passages. Substances may then be extracted from the repository tubular chambers into the main camber, which may be done by pushing the repository tubular pistons using pushing rods of the device and/or by lower pressure created in the main chamber by moving the main piston upward.

The torque arm then rotates the mixer rod to operate the mixer element and mix the substances in the main chamber. When mixing is done, the mixture may be extracted from the capsule, for example via a bottom opening of the main chamber.

The operation of the device is controlled by a controller, controls movements of the pushing rods and the torque arm sequentially during one mixing and delivering session. The operation of the pushing rods and the torque arm may be determined according to the capsule type, selected ingredients and amounts, user instructions and/or any other parameter. Optionally, an application that is operated by the user (for example installed on the phone of the user) provides instructions for the controller of the device.

Personalization of any type of preparation and/or customized mixture may be set-up by user preferences (manually or automatically by diagnosis) or may be set-up by an integrated diagnostic tool recommendation. For example, a capsule may contain 9 different raw substances that are stored separately and hermetically (for example 8 substances are stored in the repository tubular chambers and one substance is stored in the main chamber that may contain large volume of sealed basic ingredient). The final product that is produced may be any one of thousands of different final compositions of formulation, made from the same capsule.

Since the capsule provides hermetic storage and full separation between the ingredients with sealed tubes (prevention of exposure to oxygen nor light before use and between uses), many kinds of ingredients that are unstable and regularly may not be used in such preparations (since they are not functional and practically do not give any value), may be used effectively with capsule's fresh preparation. Users may personalize and determine mixture-ratios of any supportable mixable raw-materials (powder, liquid and gas).

Unlike pre-prepared mixtures, e.g. blocked ingredients, in which the exact ratios are undisclosed, formulation is transparent to customers and may be viewed (when applicable) on the capsule or by platform-application.

The capsule design supports a wide range of raw materials and ingredients, liquids, semisolids (gels), gases and solids (powders), some of which are potentially unstable or incompatible. For example, these ingredients are sensitive to oxidation (air), to light (photosensitive) or may react and/or alter solubility of each other.

The capsule design supports changeable quantities of raw materials inside each tube by the same capsule's mechanical structure and interface. It is also possible to partially fill in advance tubes with smaller quantities of ingredients. Capsule and device design supports flexible and changeable feed-tube dimensions (even without scale-up or scale-down considerations). The device allows preparation of small fresh batches (continuously) by mixing each time only part of each ingredient according to user's definition, and/or creation of different preparation types by selectively using only some of the ingredients. The device allows one-time preparation or multiple preparations per capsule. The design supports very accurate metered amount of dispensed preparation output as result of the capsule's main chamber and main piston that controls the precise quantity that is injected.

Dispensing of preparation may be set in advance and may be stopped in the middle of the injection by the user.

Since the capsule contains all ingredients inside the tubes and not separately, there's no need for the user to manage ingredients separately and to level his supplies for specific optional formulas. Since the capsule contains an integral mixer inside and since the capsule is external to machine, there's no need of maintenance or cleaning of the device. The device may not require any setup by the user. The device may provide ready preparations within a very short time. Most of the mixture types may be ready within 30 to 60 seconds from turning on the device.

The preparations that may be made using the device include, for example, Toiletries—personal hygiene for washing and preventing unpleasant smells such as soap, shampoo, deodorants and perfumes, Personal care—for beautification use (skin care, hair care, cosmetics) and/or preparations for dermatology (derma-cosmetics), Food additives—such as substances added to food to preserve flavor or enhance its taste, appearance, or other qualities, Nutritional supplements—for example taken orally, and usually contains one or more dietary ingredients (vitamins, minerals, herbs, amino acids, and enzymes), Pharma—such as medications or drugs, homeopathy, oral care, or dental preparations and Drinks—such as a cocktail made from different alcoholic and/or non-alcoholic liquids.

For example, the device may be used to create hair dyes that are made in specifically selected colors and/or shades. A hair dye capsule may include ingredients in different colors that are sealed inside the repository tubular chambers of the capsule. According to the selected color, a specific amount of each ingredient is inserted into the main chamber to create the desired color. The device may be used at home by the end user to create a different color of hair dye according to the user's choice, or may be used for example at a hair salon, to provide a different color of hair dye for each costumer.

For another example, the device may be used to create personalized medication for a patient. A medication capsule may contain several active pharmaceutical ingredients (APIs) and/or supplements, each stored inside one of the repository tubular chambers of the capsule. A medication and/or a mix of medications mix may be prepared for a patient, based for example on specific physician prescription and/or real-time measurements of a patient's medical data. A mix with the right doses and combination of drugs may be prepared for a specific patient at a specific time, and may be optimized and/or modified accordingly, by adjusting the quantity extracted from each repository tubular chamber into the main chamber. This provides personalized, precise, on-demand medications, and/or a medication mix which is easier to take than multiple separate medications and may also improve adherence of patients.

For another example, the device may be used to create a preparation (such as a cream) from pre-formulation ingredients. Each of the repository tubular chambers of a capsule may contain one pure ingredient or a mix of ingredients and/or additives, which are only row materials and not formulations by themselves. When combined and mixed in the main chamber, the ingredients are turned into a formulation. For example, a water based ingredient and an oil based ingredient may be mixed to create a cream. In addition to modularity and personalization, this may reduce the required regulatory requirements, as the ingredients are not considered a formulation, such as cosmetic products, and potentially reduce cost.

Use of the device may provide solution to several needs of consumers. Users may want to have products that are self-prepared in real time, for example for reasons of freshness of preparations by mixing their ingredients just before use, minimizing the use of preservations and/or sensitive active raw materials that must be stored in sealed tubes with no contact with air/light for preventing oxidation or other instability reaction (for example antioxidants and/or vitamins). The capsule preserves chemical freshness by preventing instability on molecular level (molecular change), physical freshness by preventing phase separation (such as with oil & water), biological freshness by preventing active ingredient loss of activity, and microbiological freshness (vegan ingredients and/or saving preservatives) by preventing product contamination and microorganisms growth. Users may want to choose ingredients having specific characteristics, for example, vegan (doesn't contain any animal products and/or doesn't contain products that were tested on animals) and/or organic (certified by an authorized certification organization). Users may want to use products that have a "green" product life-cycle (no disposables). Users may want to have products that are custom made and/or personalized specifically for them. Users may want to control color, odor level, active ingredients ratios, sunscreens addition (and other personal care products) and/or any self-determined desired ratio of raw ingredients. Users may want to choose between available preparations formulas, define new formula for own use, use social network or the Internet to download a formula, use diagnostic tools with interface that support recommended formulas according to user's special needs (such as skin analysis by camera scan) and/or use artificial intelligence (AI) which may provide deeper level of formulas recommendations and deeper insights about the user's needs.

The application may provide the user with the ability to use other users' data, insights and recommendations of formulas and treatments' results that are shared in large scale through social media and web-based communities and/or to connect and exchange data, creating opportunities for more direct integration of the physical world to other users, resulting in efficiency improvements and economic benefits.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
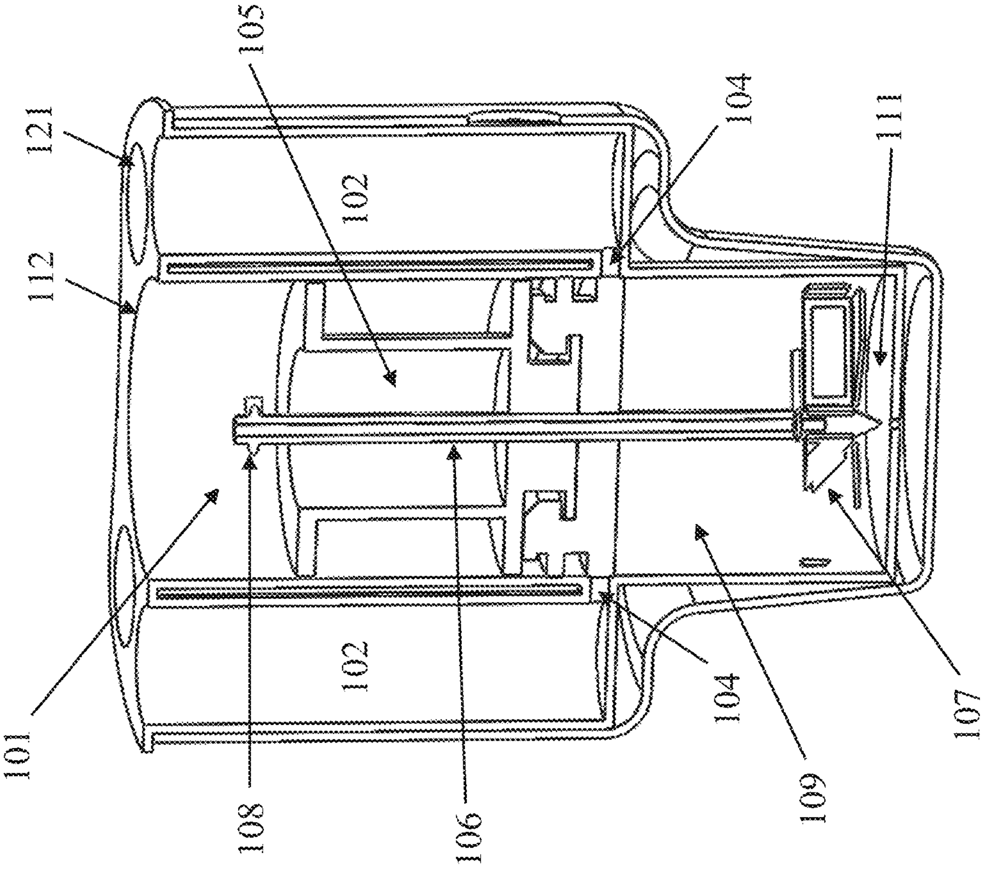
FIG. 2 is a cross section view of the capsule of FIG. 1, according to some embodiments of the present invention.

Referring now to the drawings, FIG. 1 is an illustration of a capsule for mixing multiple substances, according to some embodiments of the present invention. Reference is also made to FIG. 2, which is a cross section view of the capsule of FIG. 1, according to some embodiments of the present invention.

Capsule 100 comprises a main chamber 101 having a main chamber bottom 111 and a main chamber top opening 112.

Capsule 100 also comprises at least two repository tubular chambers 102, which are mechanically connected to main chamber 101, and each having a repository tubular chamber top opening 121. Optionally, repository tubular chambers 102 are peripheral to main chamber 101.

Each of the repository tubular chambers 102 is adapted to contain a substance.

The substance may be any kind of material used for preparation. The substance may be liquid such as cream, gel or syrup, may be oil based or water based, may be a stabilizer or concentrated fluids, and may include flavors and/or pigments. The substance may be powder, for example solid ingredients that need a dry-storage before mixing them with liquids preparations or gas inhalers mixtures. The substance may also be gas. The substance may be a biological substance such as botanical or herbal (for example cannabis derived substances) or non-biological chemical substance.

Figure 4:
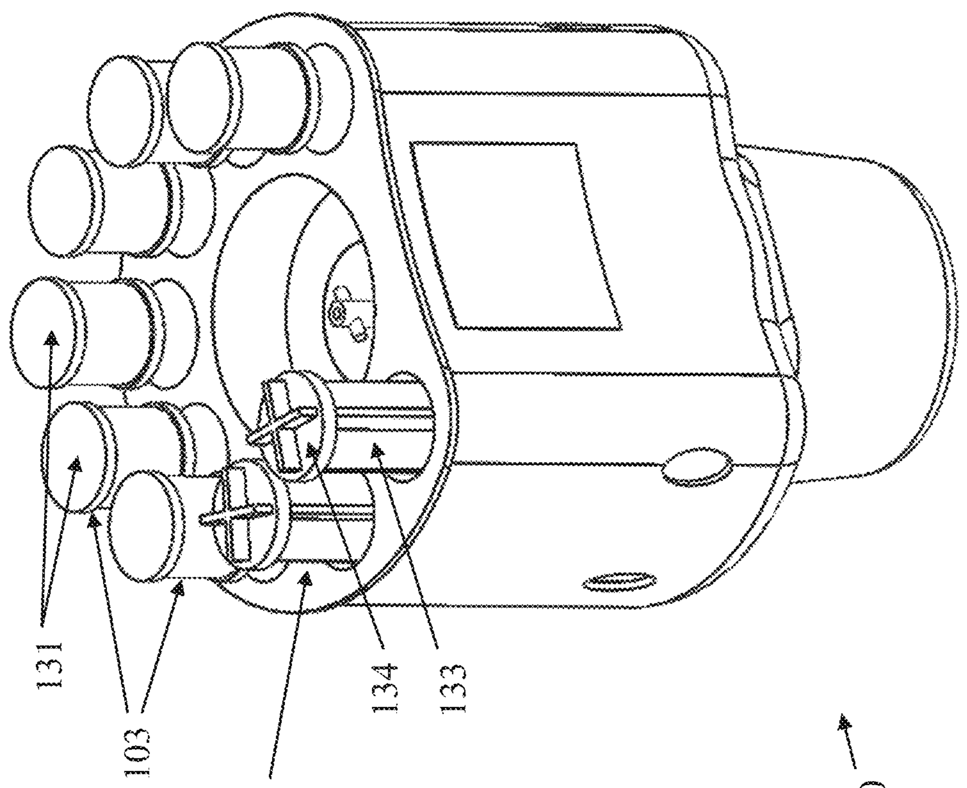
FIGS. 3 and 4 are drawings of a cross section view and a side view, respectively, of the capsule of FIG. 1 with repository tubular pistons, according to some embodiments of the present invention.
Figure 3:
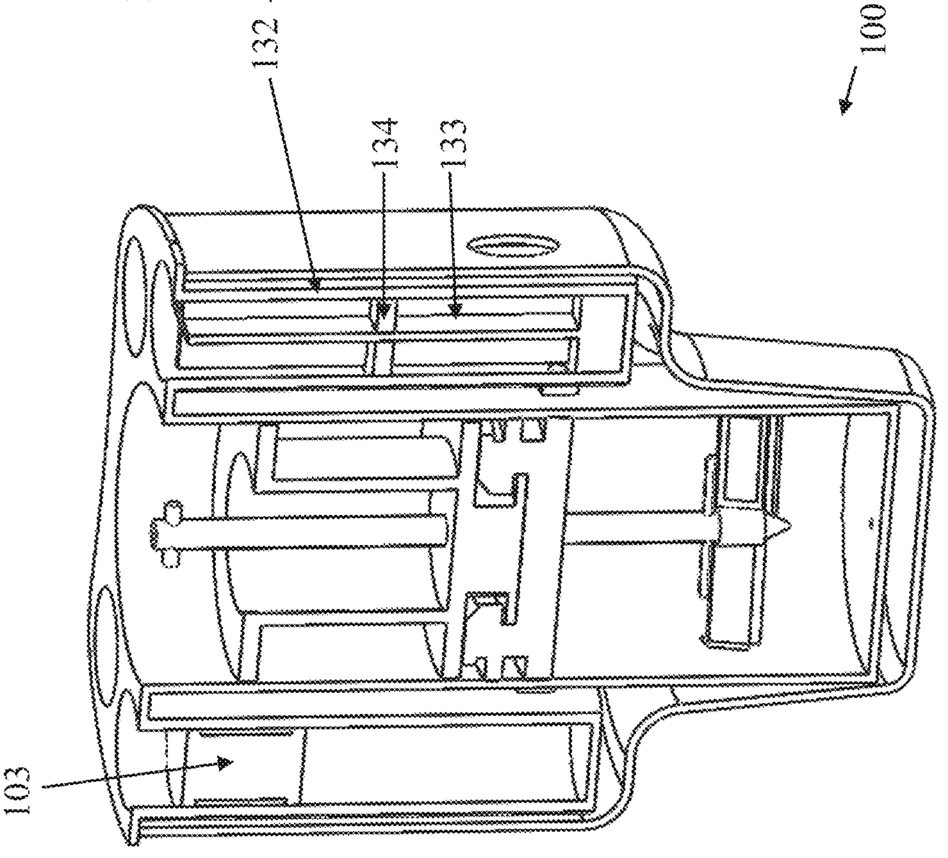

Optionally, each of the repository tubular outer openings 121 is sealed by a repository tubular piston 103. Reference is now made to FIGS. 3 and 4, which are drawings of a cross section view and a side view, respectively, of the capsule of FIG. 1 with repository tubular pistons, according to some embodiments of the present invention. Repository tubular pistons are pulled out in FIG. 4. Repository tubular pistons 103, for example, may be used when the substance inside the repository tubular chamber is liquid or gas. Liquids and gases are easy to inject, so repository tubular piston 103 are simple and similar to syringe regular piston with high sealing-performances.

Optionally, when the substance inside the repository tubular chamber is powder, a rotatable powder repository tubular piston 132 may be used. Powders are not easy to inject through narrow holes, such as passages 104. A propeller-based mechanism may be needed to deliver metered dose of powder from repository tubular piston 132 to main chamber 101. Powder repository tubular piston 132 may be rotated by a pushing rod 204 which is also rotating. Powder repository tubular piston 132 includes a main rotating propeller part 133 in the shape of a plus (+), pushing the powder through the passage aside, and a hollow disk part 134 that rotates with the propeller freely and functions as a piston that prevents powder from leaking upwards.

Each of the repository tubular chambers 102 is fluidly connected to main chamber 101 by a passage 104, from which substance may flow from the repository tubular chambers 102 to main chamber 101.

A main piston 105 is fitted in main chamber 101 and optionally sealing main chamber 101. Optionally, in an inward position, main piston 105 is sealing passages 104. When main piston 105 is moved along main chamber 101 to an outward position, passages 104 are open and substance may flow from the repository tubular chambers 102 to main chamber 101.

A mixer rod 106 is fitted to pass along main piston 105. Mixer rod 106 comprises a mixer element 107 disposed at a distal end, and a torque adapter 108 disposed at a proximal end. Torque adapter 108 is used for transferring a torque to mixer element 107. Mixer element 107 is mounted in main chamber 101 between main chamber bottom 111 and a distal end of main piston 105.

Capsule 100 may be made of any material, for example, acrylic glass (methyl methacrylate), polyethylene terephthalate glycol, polypropylene, acrylonitrile styrene (acrylate), polystyrene, aluminum, acrylonitrile butadiene styrene, polyethylene, terephthalate, glass and/or any other material. Different preparations and different raw-ingredients require different storage materials, such as chemical resistant materials to acids or bases, bio-safe materials especially for medical and/or nutritional supplements preparations and/or antioxidants or vitamin that need an oxygen barrier to preserve stability. The mixing and preparing process may also require specific material characteristics, for example thermal resistance. The internal part of capsule 100 (which is not exposed to users—internal parts of main chamber 101 and repository tubular chambers 102) may be produced from various materials according to ingredients' specifications and storage and/or mixing requirements. The structure of capsule 100 (and specifically of comprises a main chamber 101 and/or repository tubular chambers 102) may be designed to withstand internal forces without deformation, for example when viscosity of the substances is high or increased, for example during refrigeration.

Capsule 100 is adapted to fit into a device 200, which holds capsule 100 and facilitates the mixing of substances.

Figure 5B:
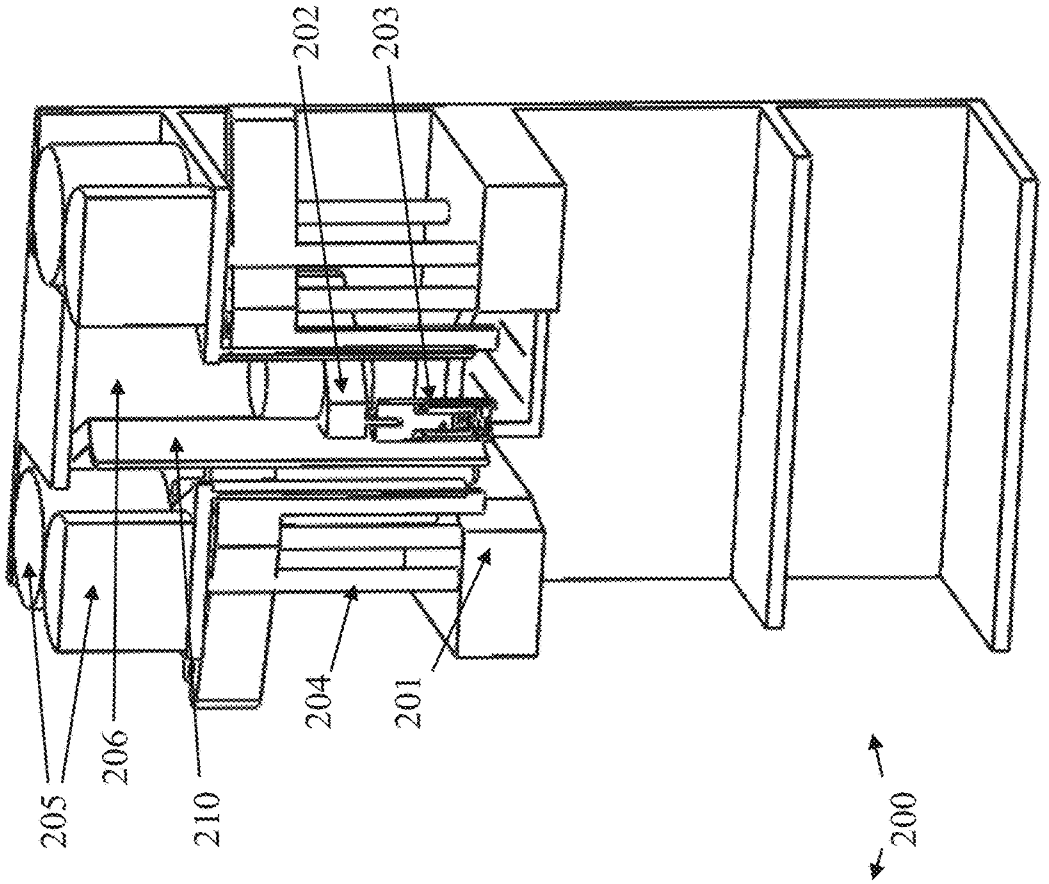
FIGS. 5A and 5B are drawings of a front view and a cross section view, respectively, of a device for mixing multiple substances in a capsule, according to some embodiments of the present invention.
Figure 5A:
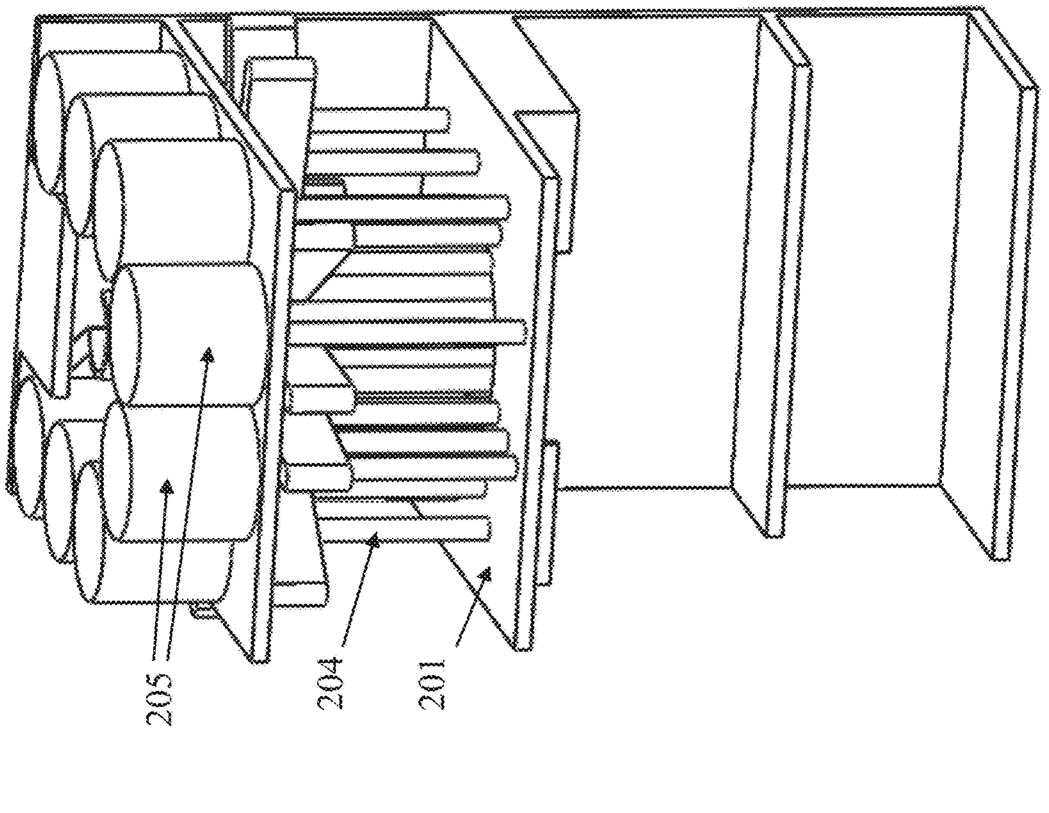
Figure 6B:
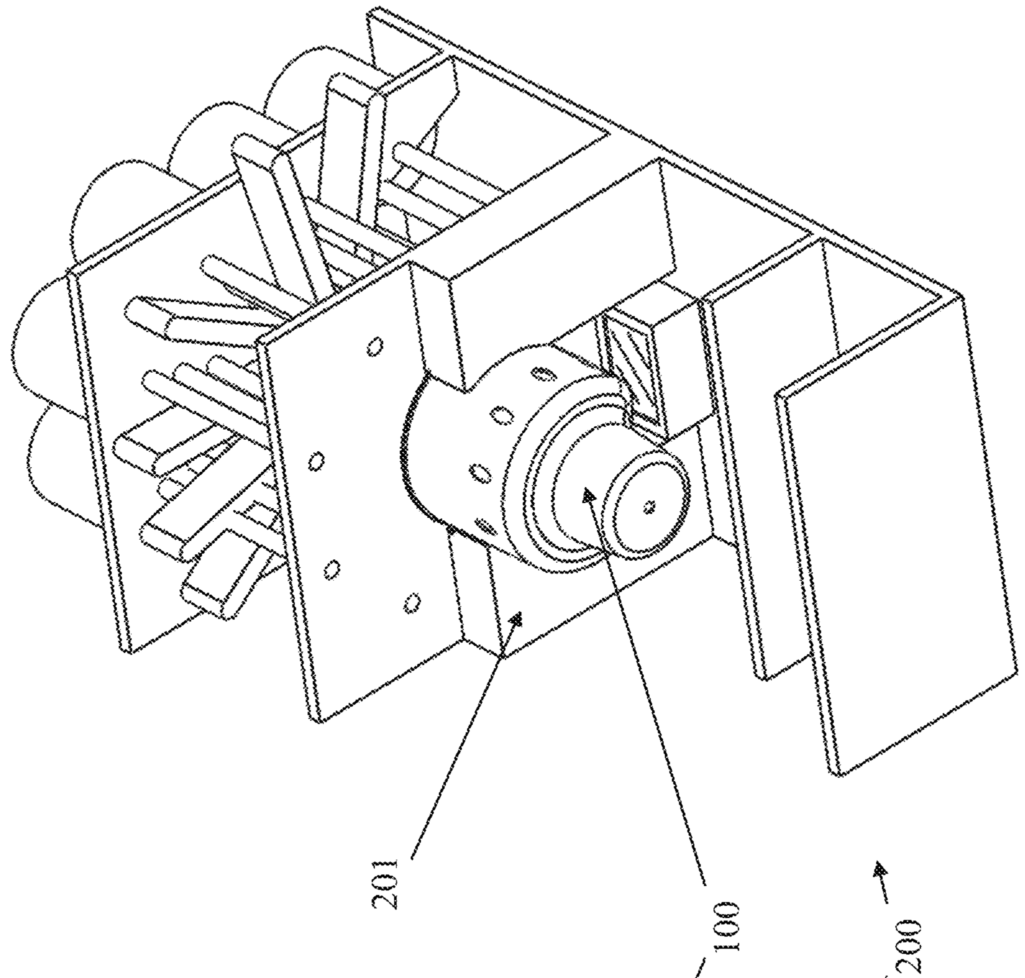
FIGS. 6A and 6B are drawings of the device of FIG. 5A with the capsule of FIG. 1, from different views, according to some embodiments of the present invention.
Figure 6A:
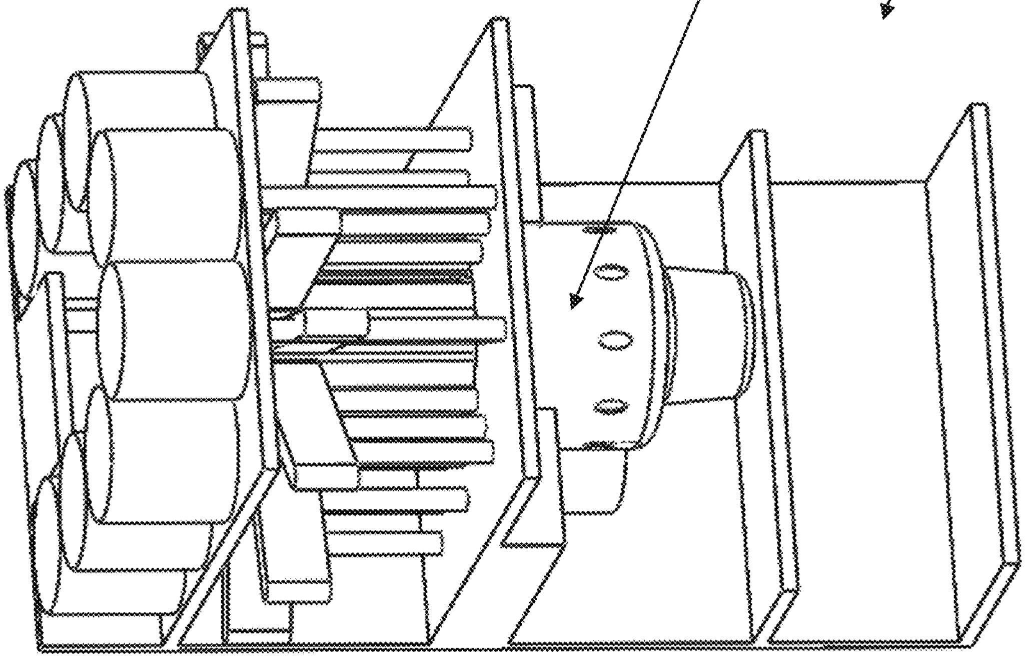

Reference is now made to FIGS. 5A and 5B, which are drawings of a front view and a cross section view, respectively, of a device for mixing multiple substances in a capsule, according to some embodiments of the present invention. Reference is also made to FIGS. 6A and 6B, which are drawings of the device of FIG. 5A with the capsule of FIG. 1, from different views, according to some embodiments of the present invention.

Device 200 includes a fixture 201 for a single capsule 100. Device 200 and/or capsule 100 may be of any size, for example according to the required quantities of substances and/or final mixed product.

Device 200 also includes a torque arm 202 having a clamp 203 for holding mixer rod 106. Torque arm 202 is adapted to rotate, pull and push mixer rod 106 along an axis of mixer rod 106, by holding torque adapter 108. Optionally, clamp 203 is adapted for grabbing and releasing torque adapter 108. Optionally, torque arm 202 includes an actuator for pulling and pushing mixer rod 106, and/or a rotor for rotating mixer rod 106.

Optionally, device 200 includes at least two pushing rods 204, each adapted to push a repository tubular piston 103 into a repository tubular chamber 102 to extract substance into main camber 101.

Optionally, device 200 includes at least one motor 205 operating pushing rods 204 and torque arm 202. Optionally, pushing rods 204 and torque arm 202 are operated by separate motors, for example separate motors are operating each of pushing rods 204 and another motor is operating torque arm 202.

Device 200 also includes a controller 206 adapted to identify a capsule 100 in fixture 201 and control movements of torque arm 202 and optionally pushing rods 204 sequentially during one mixing and delivering session. Optionally, pushing rods 204 are separately controlled by controller 206 so pushing rods 204 are not moved simultaneously. This way, substances stored in repository tubular chambers 102 may be moved into main chamber 101 at different stages of the preparation process, and/or only selected substances and/or quantities of the substances stored in repository tubular chambers 102 may be moved into main chamber 101.

Controller 206 may include a processor which executes software that includes instructions for performing a method according to some embodiments of the present invention. The processor may include one or more processors arranged for parallel processing, such as clusters and/or as one or more multi core processor(s), and/or any other processing hardware. Controller 206 may also include a communication module, which may connect via a network to a computing device operated by the user, such as a mobile phone. The user may provide instructions to controller 206 via a user interface of the computing device, for example by software application installed on the mobile phone. The user may select the properties of the desired mixture, the application and/or controller 206 calculate the correct movements of torque arm 202 and/or pushing rods 204 to create the desired mixture.

Figure 7A:
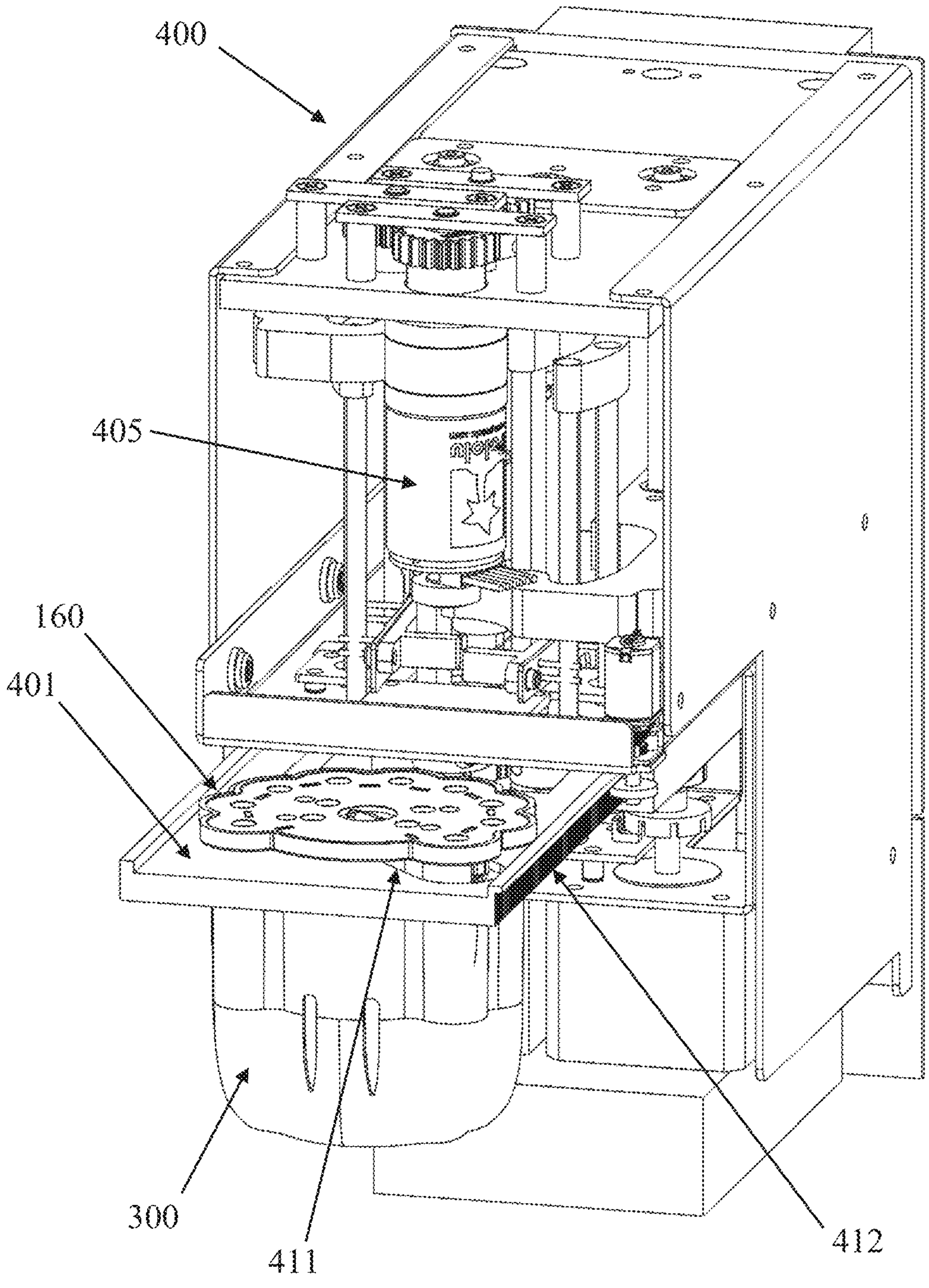
FIGS. 7A and 7B are drawings of a device with a capsule and a tray at an open position and at a closed position, respectively, according to some embodiments of the present invention.
Figure 7B:
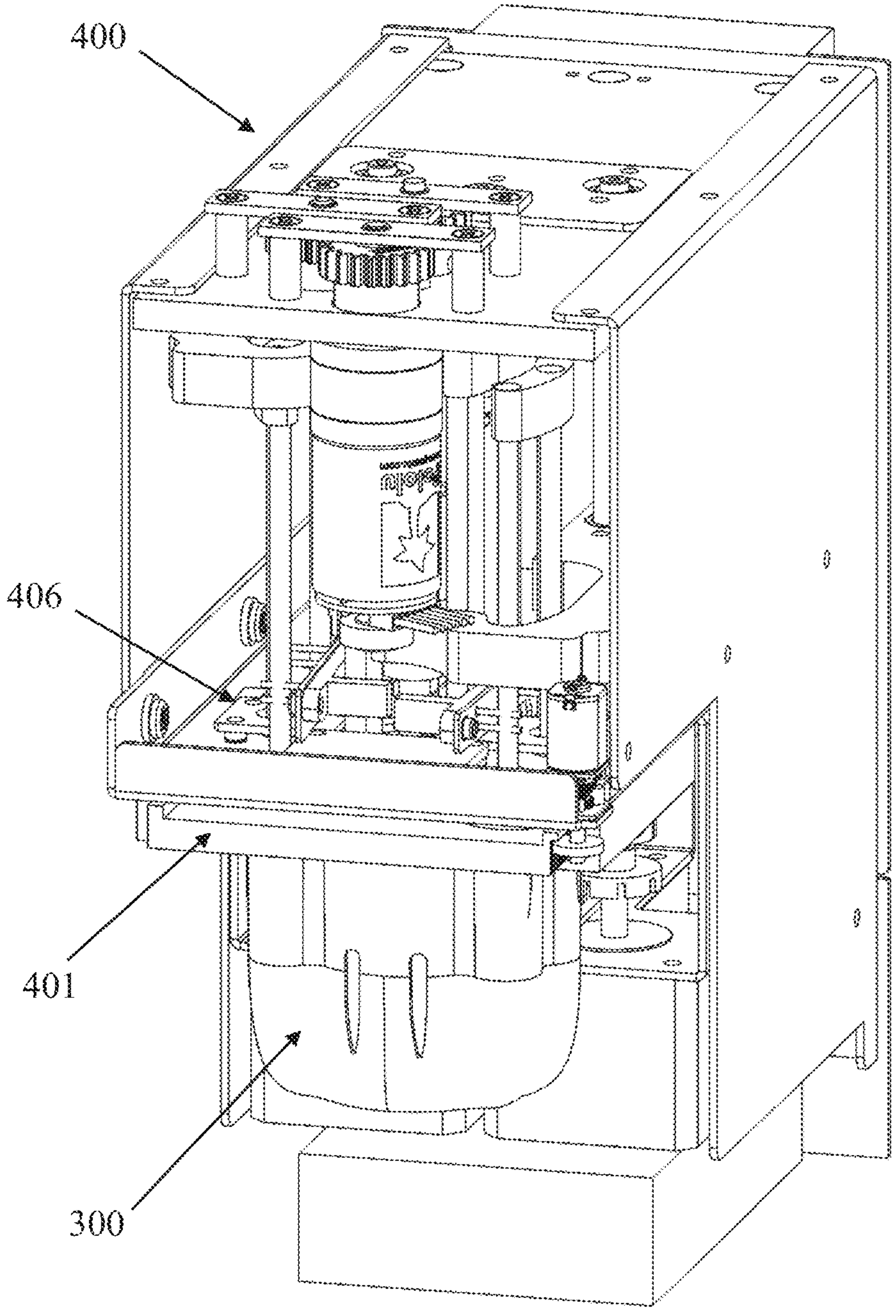

Reference is also made to FIGS. 7A and 7B, which are drawings of a device 400 with a capsule 300 and a tray at an open position and at a closed position, respectively, according to some embodiments of the present invention. Device 400 includes a tray 401, for holding capsule 300, capsule 100 and/or other capsules. Tray 401 has an open position wherein a capsule 300 may be inserted, and a closed position wherein the capsule is fixed inside device 400. Tray 401 may be opened and/or closed electronically or manually by the user. Tray 401 includes an opening 411 though which capsule 300 is inserted. Opening 411 is large enough to accommodate the body of capsule 300, but not large enough to accommodate a rim 350 of capsule 300, therefore the capsule 300 is held by tray 401 via rim 160. Optionally, opening 411 is sized and shaped to accommodate one or more types of capsules, with different sizes and/or shapes. Optionally, tray 401 includes a top recess which is shaped and sized to accommodate rim 160 and/or different sizes and shapes of rims, to direct the orientation of inserting capsule 300 into opening 411. Tray 401 may be closed, as shown at FIG. 7B to position capsule 300 inside device 400. Tray 401 may be closed, for example, using rails 412.

Figure 8:
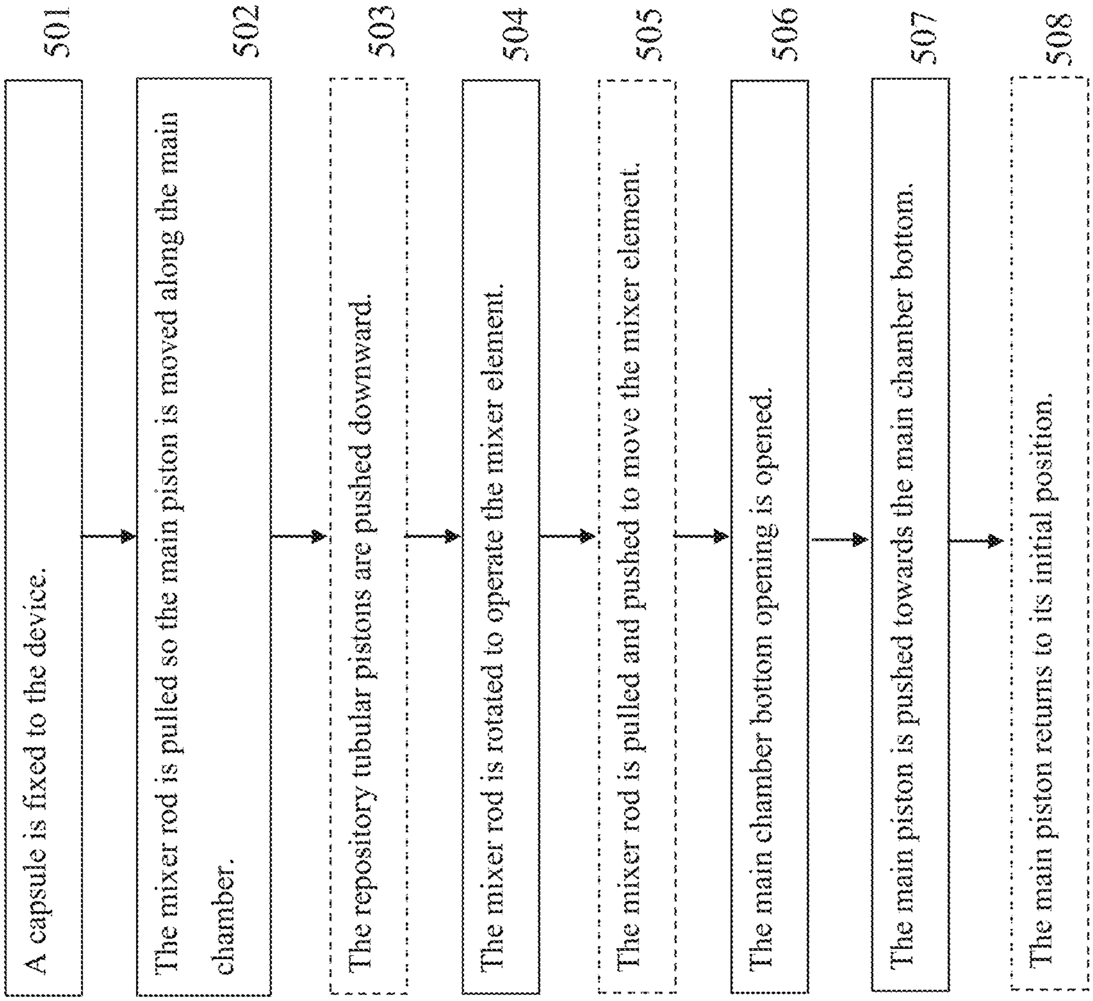
FIG. 8 is a flowchart schematically representing a method for mixing multiple substances in a capsule, according to some embodiments of the present invention.

Reference is now made to FIG. 8, which is a flowchart schematically representing a method for mixing multiple substances in a capsule, according to some embodiments of the present invention.

Reference is also made to FIGS. 9A, 9B, 9C, 9D, 9E, 9F, 9G, 9H and 9I, which are cross section drawings of device 400 with capsule 300, at different stages of the method of FIG. 8, according to some embodiments of the present invention.

Figure 9A:
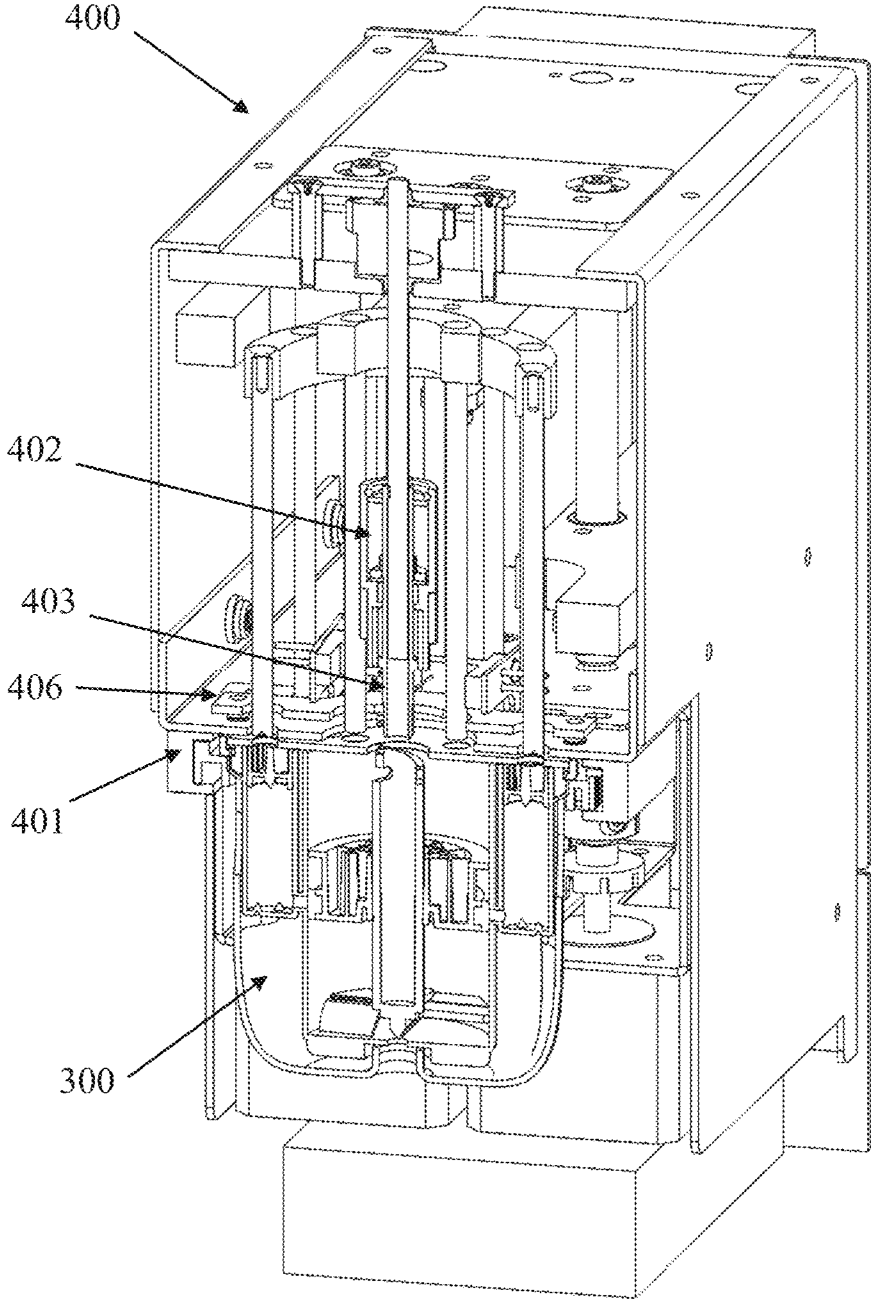
FIGS. 9A, 9B, 9C, 9D, 9E, 9F, 9G, 9H and 9I are cross section drawings of the device of FIG. 7A, at different stages of the method of FIG. 8, according to some embodiments of the present invention.

First, as shown at 501 and FIG. 9A, a capsule 300 is fixed to device 400, by tray 401. Other capsule fixtures may include, for example, rails of the device on which a rim of the capsule is sliding, a threaded opening for attaching a capsule in a screwing motion and/or a quick release mechanism which locks the capsule for example by clips.

Optionally, the capsule fixed in tray 401 is identified by controller 406, for example by scanning a barcode printed on the capsule, such as a quick response (QR) code. This may be done, for example, by an imaging sensor included in device 400. Optionally or alternatively, the capsule fixed in tray 401 is identified by device 400 using radio-frequency identification (RFID) chip included in the capsule, and an RFID reader included in device 400.

Optionally, device 400 is adapted to fix capsules which are different from each other for example by length, physical structure, material, mixer element shape and/or other characteristics.

Figure 10C:
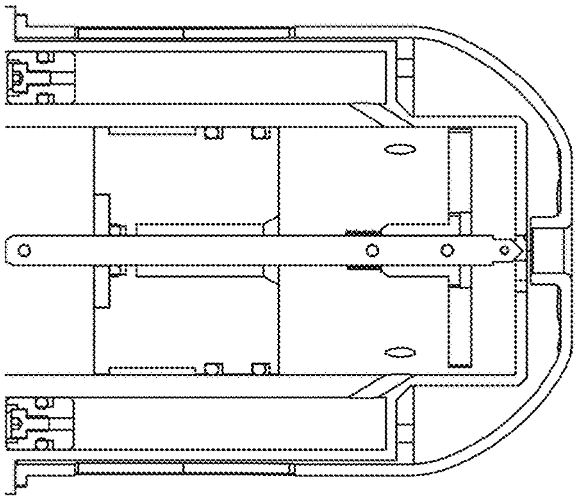
FIGS. 10A, 10B and 10C are cross section drawings of exemplary sizes of capsules, according to some embodiments of the present invention.
Figure 10B:
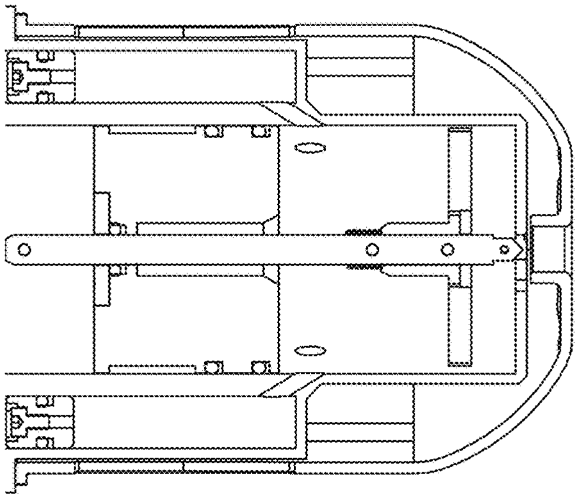
Figure 10A:
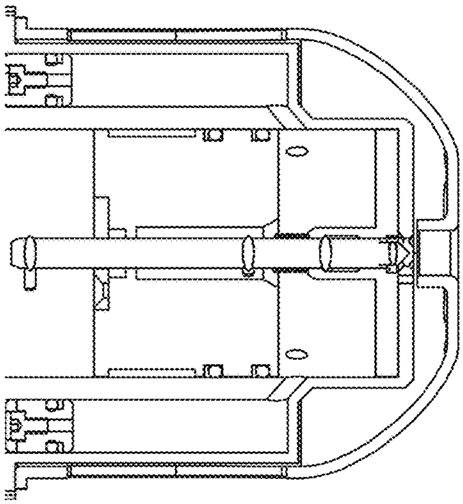

Optionally, device 400 is adapted to fix capsules of different sizes. Reference is now made to FIGS. 10A, 10B and 10C, which are cross section drawings of exemplary sizes of capsules, according to some embodiments of the present invention. FIG. 10A shows a capsule having a small main chamber and small repository tubular chambers. FIG. 10B shows a capsule having a larger main chamber, and FIG. 10C shows a capsule having larger repository tubular chambers. Longer (or shorter) length of repository tubular chambers and longer (or shorter) length of main chamber determines the general volume of the capsule, for example between volume of 5 milliliters (ml) to volume of 65 ml.

Figure 11C:
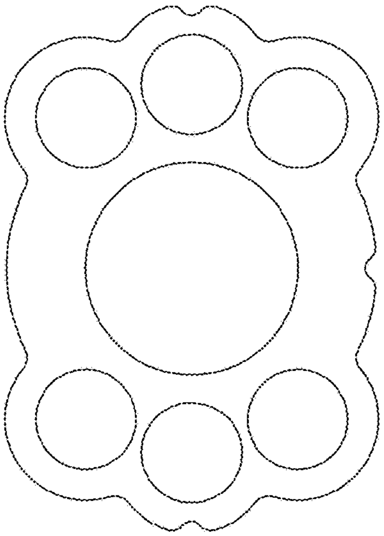
FIGS. 11A, 11B and 11C are top view drawings of exemplary capsules having different number of repository tubular chambers and/or different diameters of openings, according to some embodiments of the present invention.
Figure 11B:
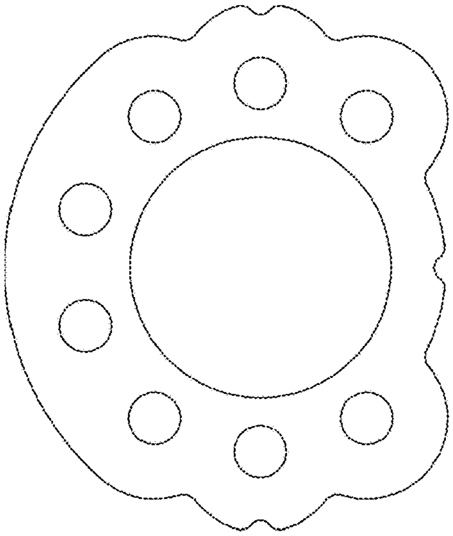
Figure 11A:
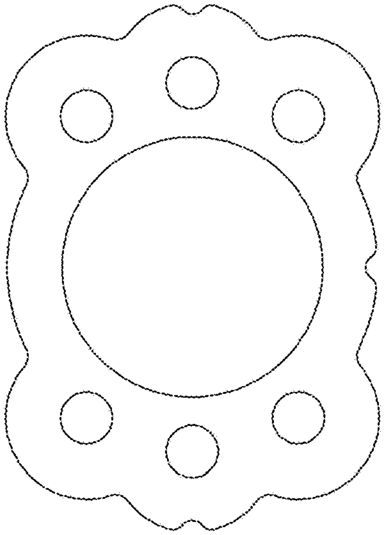

Optionally, device 400 (and/or device 200) is adapted to fix capsules having different number of repository tubular chambers and/or different diameters of openings. Reference is now made to FIGS. 11A, 11B and 11C, which are top view drawings of exemplary capsules having different number of repository tubular chambers and/or different diameters of openings, according to some embodiments of the present invention. FIG. 11A shows a capsule having six repository tubular chambers, FIG. 11B shows a capsule having 8 repository tubular chambers, and FIG. 11C shows a capsule having smaller diameter of main chamber top opening and larger diameter of repository tubular chamber top openings. Larger diameter of repository tubular chambers may result in smaller main chamber diameter.

Figure 12C:
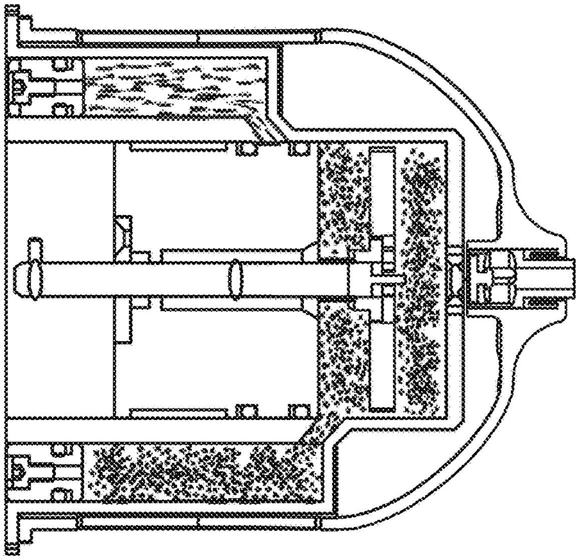
FIGS. 12A, 12B and 12C are cross section drawings of exemplary capsules having different initial filling states, according to some embodiments of the present invention.
Figure 12B:
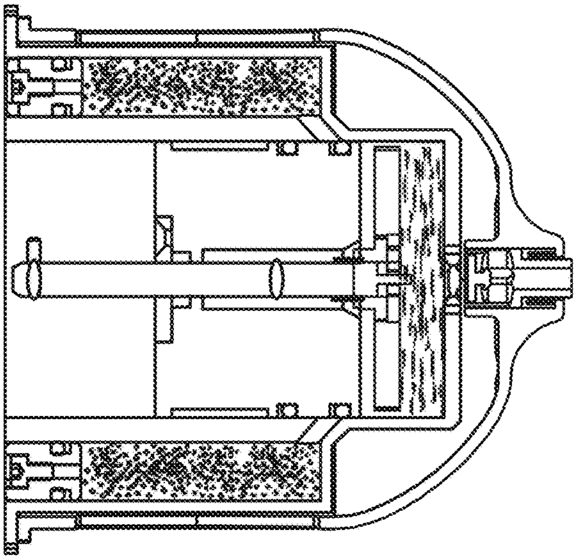
Figure 12A:
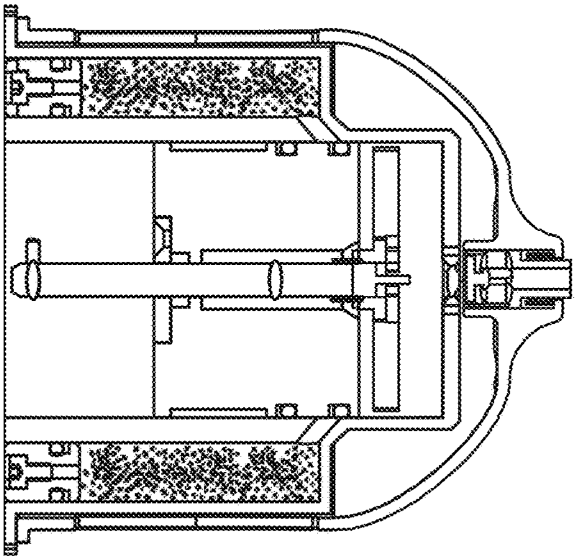

Optionally, the capsule may have different initial filling states. Reference is now made to FIGS. 12A, 12B and 12C, which are cross section drawings of exemplary capsules having different initial filling states, according to some embodiments of the present invention. FIG. 12A shows a capsule with repository tubular chambers filled with substances. Optionally, each repository tubular chamber is filled with a different substance. In this case, ingredients are located inside the repository tubular chambers only, with no ingredients storage inside the main chamber (liquid nor powder) before capsule's first usage. FIG. 12B shows a capsule with repository tubular chambers filled with substances and a main chamber partially filled with a different substance. In this case, the main chamber is for example full of liquid or base cream in advance. For example, the main chamber may be filled with substance which is crystalized when refrigerated (for example Vaseline based substance) and cannot move through the passages, but the crystallization is overturned when substance(s) from the repository tubular chamber(s) are added to the main chamber. For another example, the main chamber is filled with powder and optionally air in advance (for example active material or food-additive). When only part of the main chamber is filled with powder and the rest of it is free-space (air) there is no clamp caused by sub-pressure resistance, as described below. FIG. 12C shows a capsule with one or more repository tubular chamber(s) filled with substance and a main chamber partially filled with the same substance, and other one or more repository tubular chamber(s) filled with substance. Optionally, one or more of the passages are not sealed by the main piston, for example to prevent clamps caused by sub-pressure resistance.

Optionally, the capsule includes windows 110. Windows 110 may be located on repository tubular chambers 102 for external view of the ingredients before preparation, and/or located on main chamber 101 for external view of the mixing process. Windows 110 may be made of transparent or light-guided internal-part material. Some raw materials and vitamins which are sensitive to light-exposure or direct sun-light presence, repository tubular chambers 102 are made of sealed-to-light material (cheaper) and capsule cover has no window in this case.

Figure 13B:
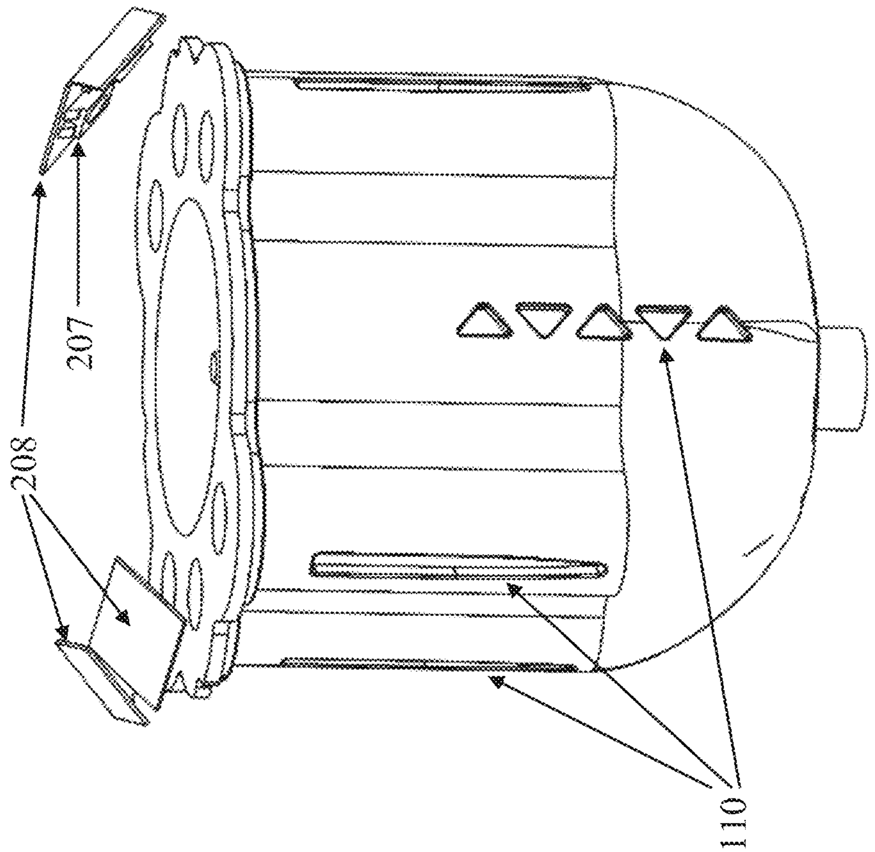
FIGS. 13A and 13B are drawings of a capsule and lighting elements of the device of FIG. 5A, according to some embodiments of the present invention.
Figure 13A:
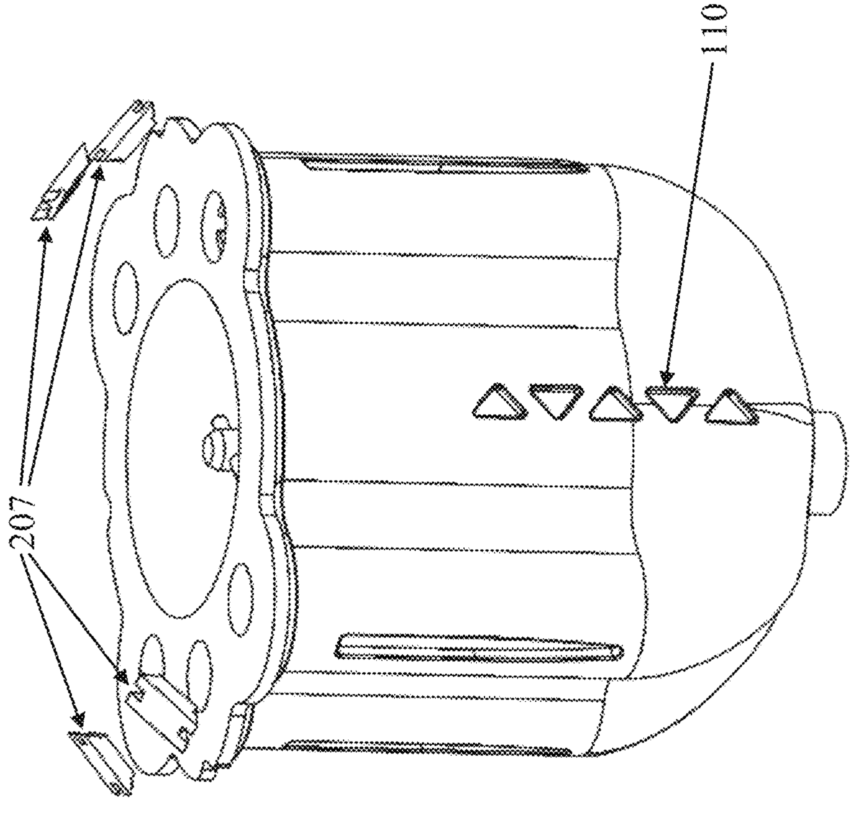

Optionally, the capsule includes a lighting element which is operating according to the status of the mixing process, to provide indication for the user. For user experience, lighting of the capsule with different colors and blinking-types is a strong indication feature for users and it demonstrates the operational-state of the machine or the preparation process. Reference is now made to FIGS. 13A and 13B, which are drawing of a capsule and lighting elements of device 200, according to some embodiments of the present invention. The lighting elements may be light-emitting diodes (LEDs) 207. LEDs 207 may each be positioned on a separate circuit board 208, or may be positioned on one board lighting interface. Optionally, the internal capsule body is made of light-guide materials that let light spread inside and be seen through windows 110.

Figure 14A:
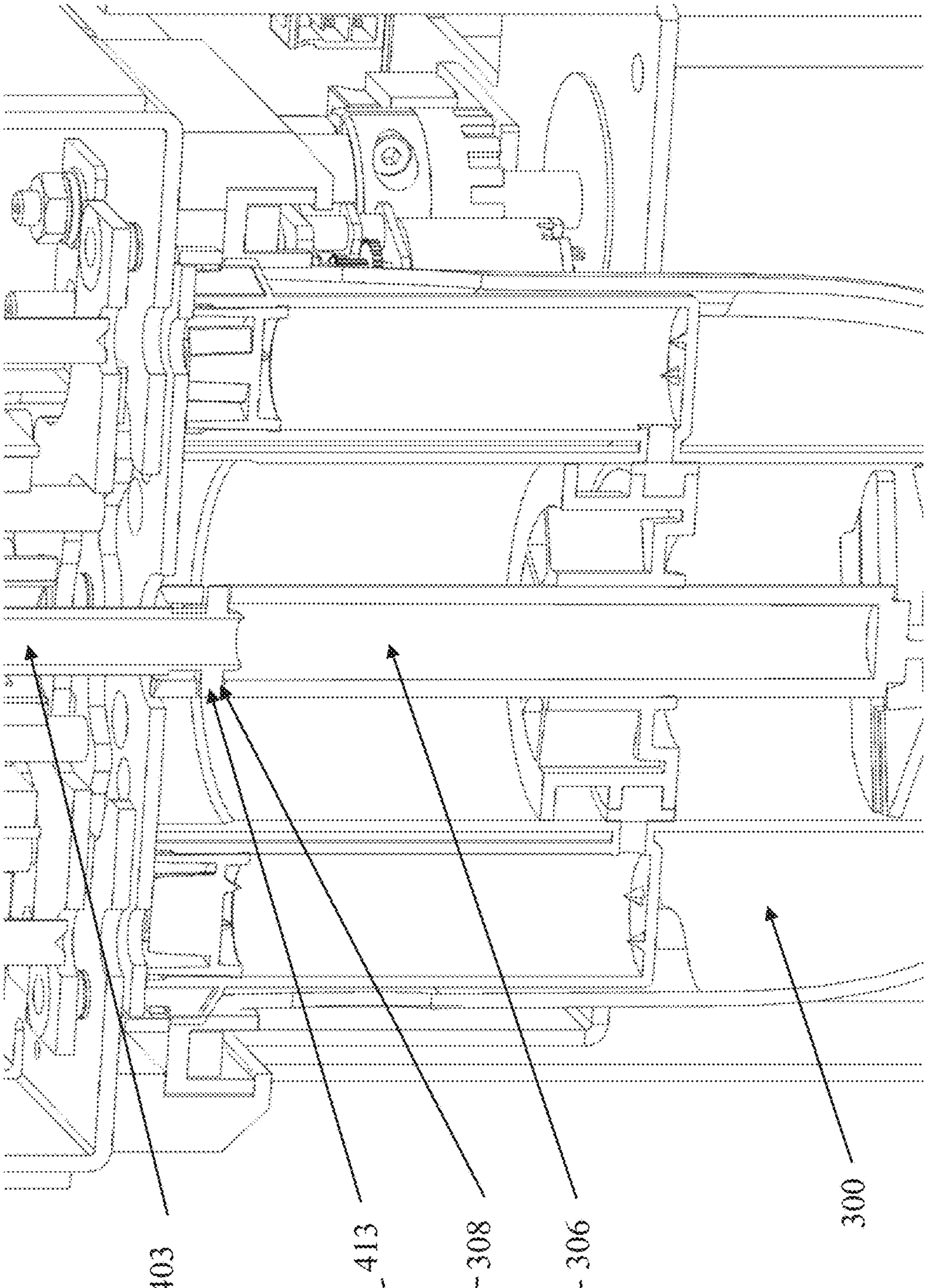
FIG. 14A is a drawing of an enlarged cross section view of a torque piston of a device, according to some embodiments of the present invention.
Figure 14B:
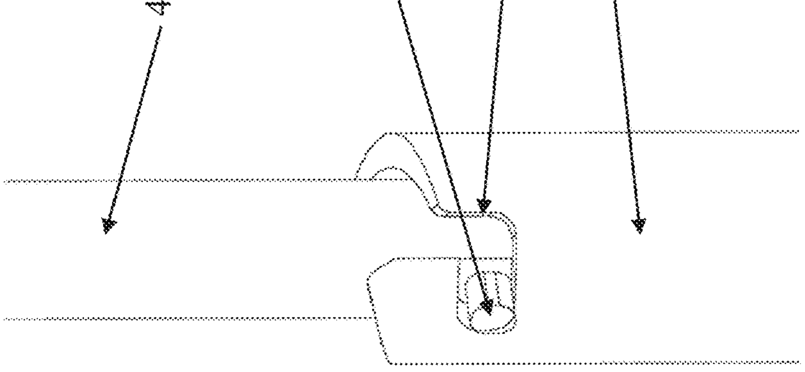
FIG. 14B, which is a drawing of a torque piston inserted into a mixer rod, according to some embodiments of the present invention.

Then, optionally, after capsule 300 is fixed to device 400, a torque element 402 (equivalent to torque arm 202) moves down so a torque piston 403 is attach to mixer rod 306. Reference is now made to FIG. 14A, which is a drawing of an enlarged cross section view of torque piston 403 of the device 400, according to some embodiments of the present invention. Reference is now made to FIG. 14B, which is a drawing of torque piston 403 inserted into mixer rod 306, according to some embodiments of the present invention. Mixer rod 306 includes a tube part, so when torque element 402 moves down, torque piston 403 is inserted into mixer rod 306. Torque piston 403 includes one or more pins 413 which are inserted into the torque adapter that includes slots 308 of mixer rod 306. The pins 413 are locked when torque piston 403 is rotated by torque element 402.

Figure 15:
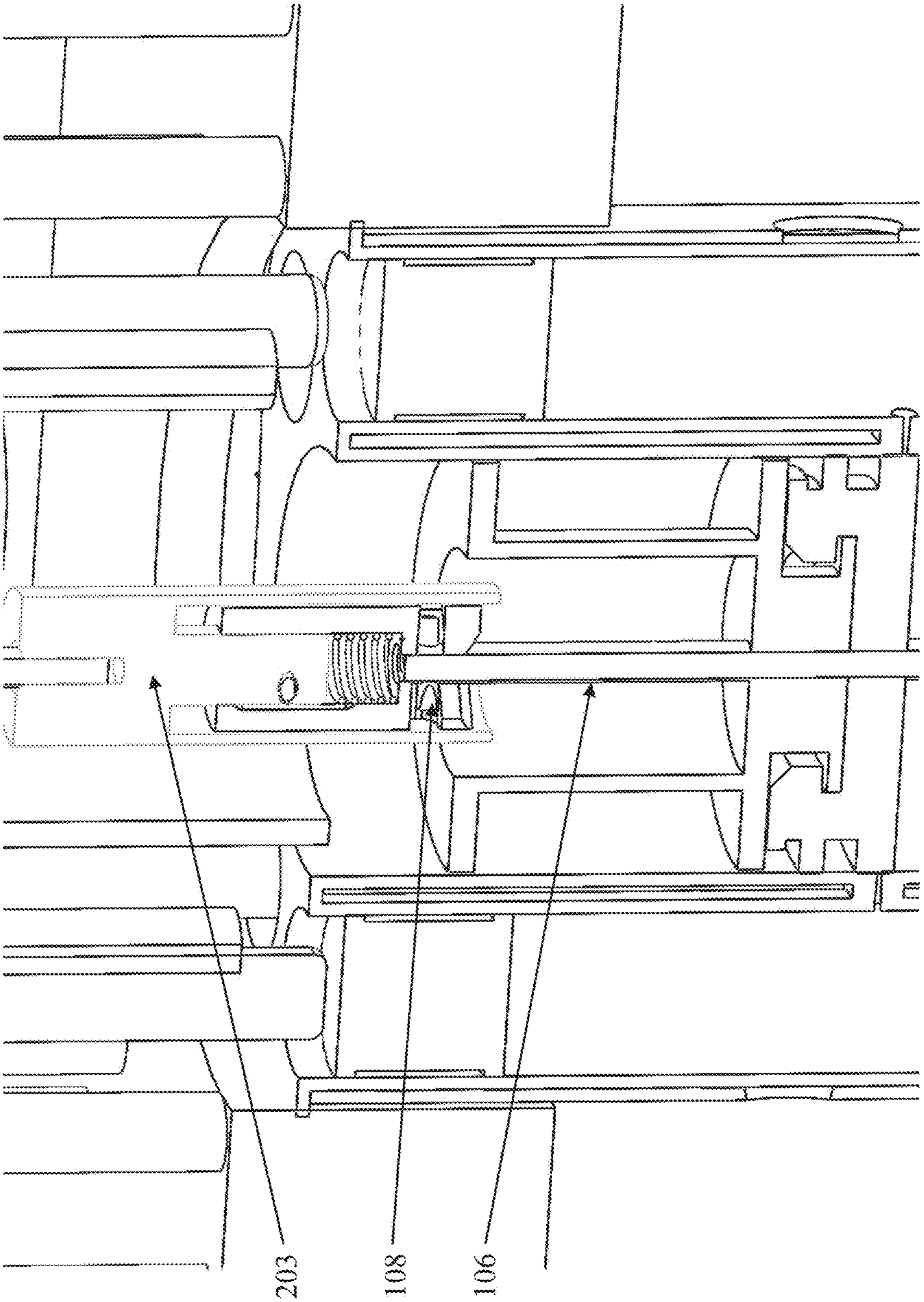
FIG. 15 is a drawing of an enlarged view of a cross section of a clamp of the device of FIG. 5A, according to some embodiments of the present invention.

Optionally or alternatively, for device 200, torque arm 202 is moved down so clamp 203 is being attached to torque adapter 108. Reference is now made to FIG. 15, which is a cross section drawing of an enlarged view of a cross section of clamp 203 of the device 200, according to some embodiments of the present invention. In this example, clamp 203 includes grooves in which are fitted for the pins of torque adapter 108 (for example 2 or 4 pins in a plus-shaped arrangement). When torque arm 202 is moved down, the pins of torque adapter 108 are inserted into the grooves of clamp 203 and are fitted inside when clamp 203 is rotated (for example ⅛ of a turn), so torque adapter 108 is engaged inside clamp 203. Since the rotation of mixer rod 106 by torque adapter 108 is in the same direction, torque adapter 108 is engaged inside clamp 203 until the capsule is to be released. This is done by rotating clamp 203 in the opposite direction (for example ⅛ of a turn), so the pins of torque adapter 108 are moved out of the grooves of clamp 203 and torque adapter 108 is disengaged from clamp 203.

Figure 9B:
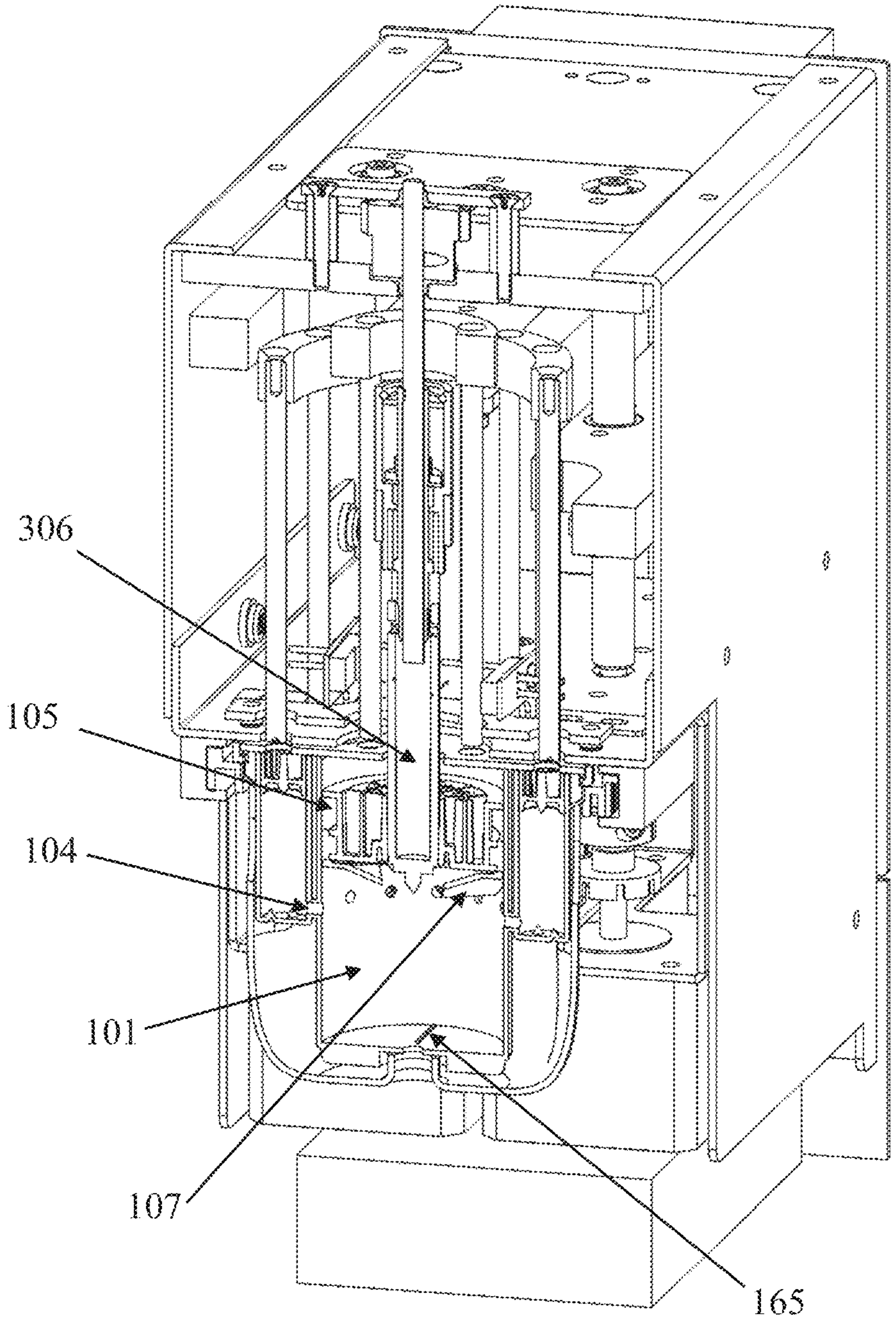

Then, as shown at 502 and FIG. 9B, mixer rod 306 is pulled so main piston 105 is moved along main chamber 101 from inward position to outward position. This movement opens passages 104, when they are sealed by main piston 105. Optionally, when mixer rod 306 is pulled, mixer element 107 is pushing main piston 105 upward.

Figure 9C:
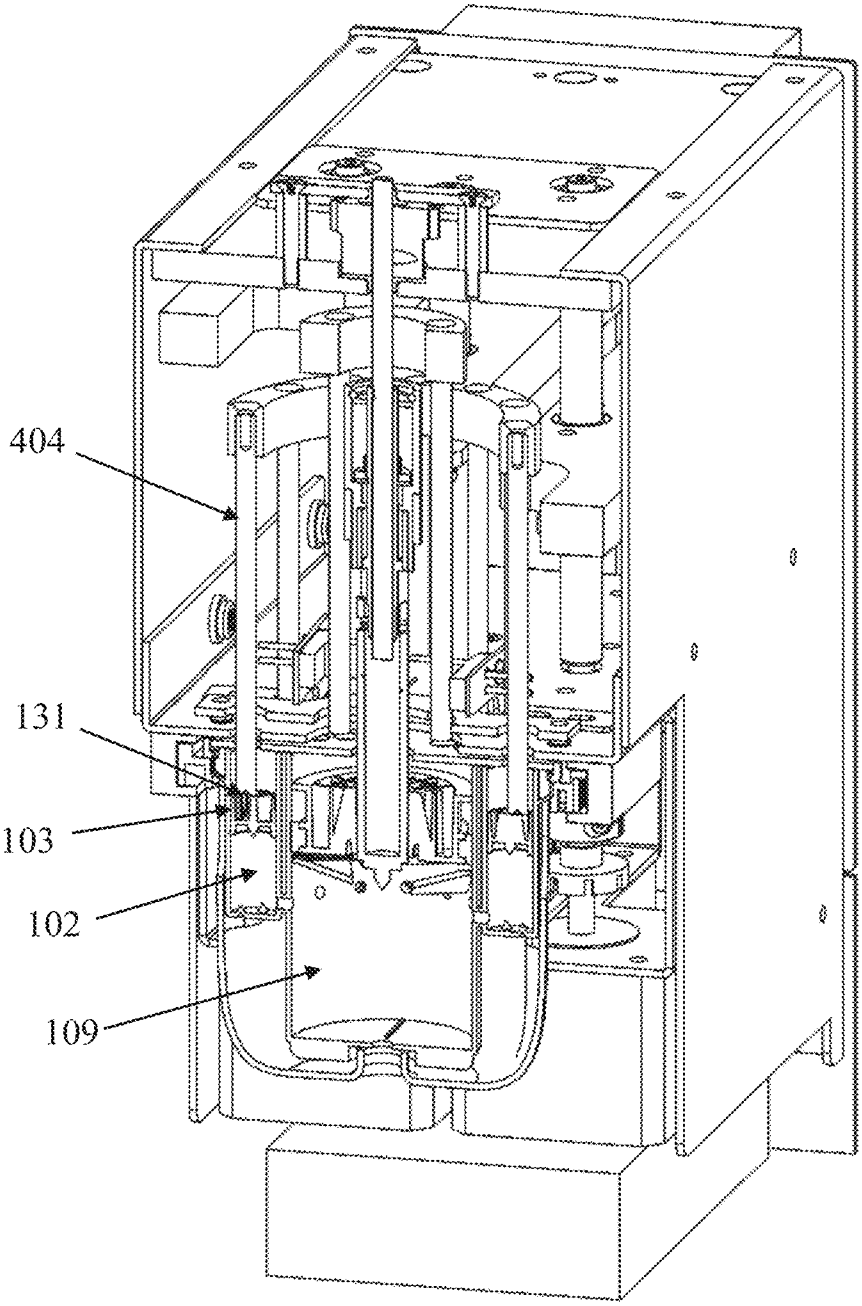
Figure 9D:
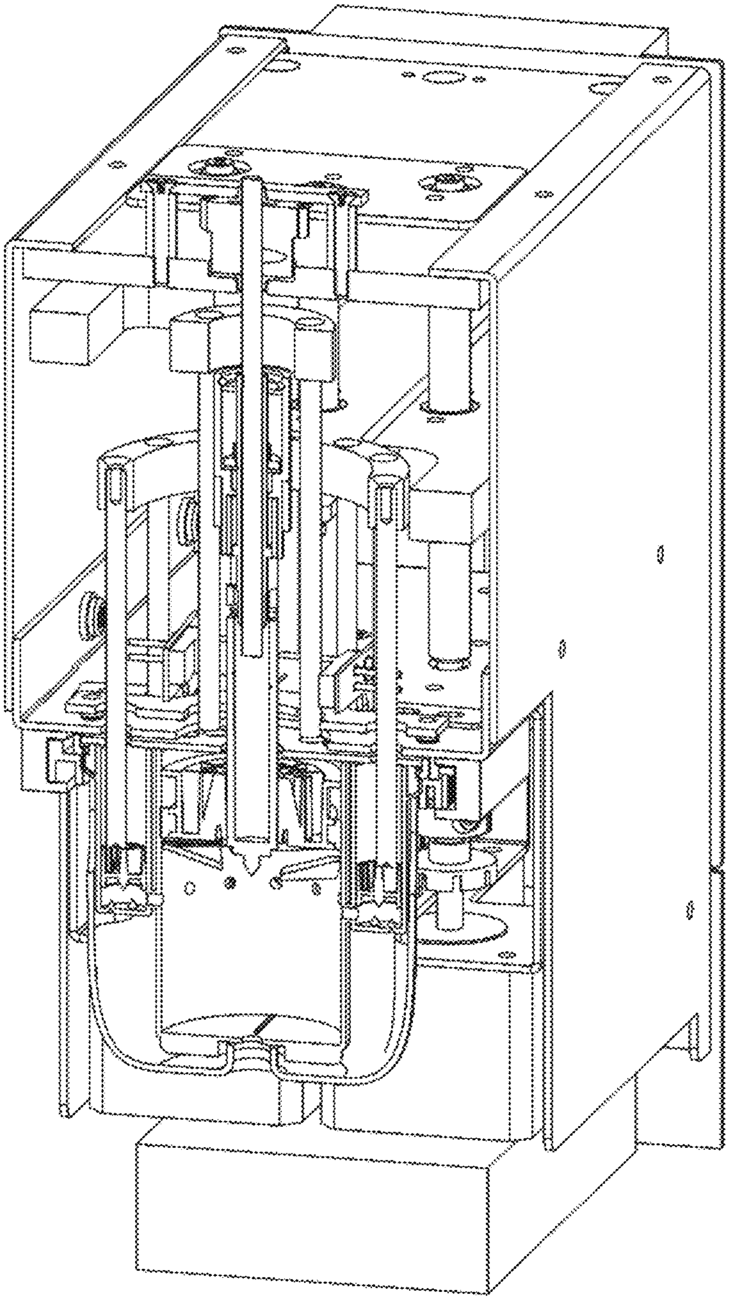

Then, optionally, as shown at 503, FIG. 9C and FIG. 9D, repository tubular pistons 103 are pushed downward to extract substances from repository tubular chambers 102 via passages 104 into an inner chamber 109 of main chamber 101 sealed by main piston 105. Optionally, repository tubular pistons 103 each include a top surface 131 which are pushed downward by pushing rods 404. Repository tubular pistons 103 may be pushed simultaneously, or may be pushed individually according to desired substances for example as defined by the user.

Optionally and alternatively, substance from each of the repository tubular chambers 102 is pulled into main chamber 101 via passages 104 by movement of main piston 105. Lower pressure is created inside main chamber 101, which causes substance from each of the repository tubular chambers 102 to be pulled into main chamber 101.

Figure 16:
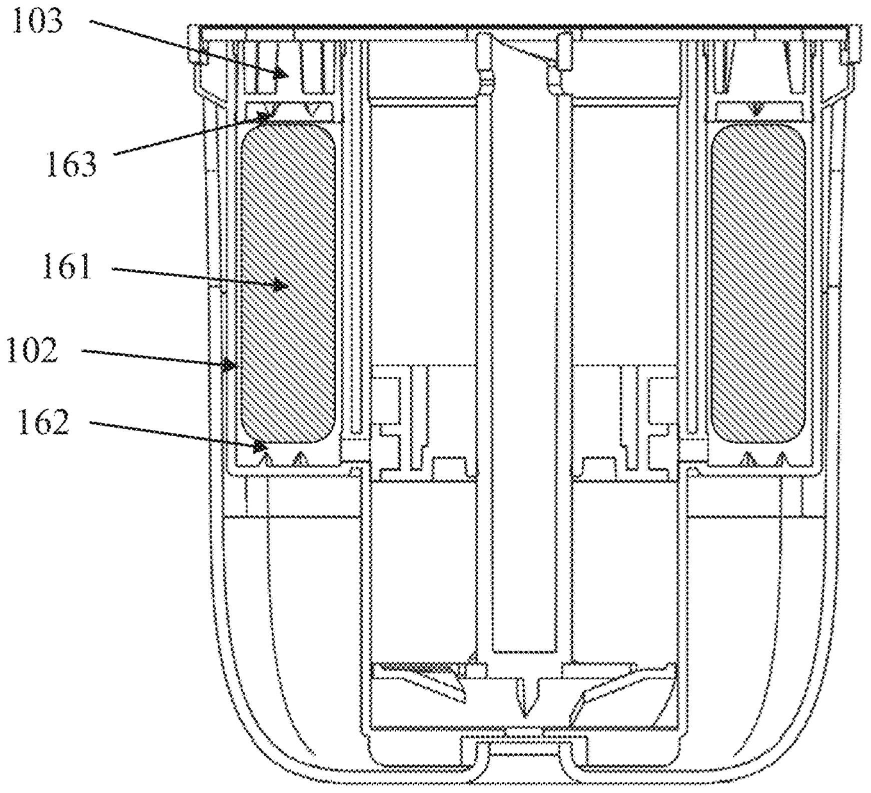
FIG. 16 is a cross section drawing of a capsule having sharp tips inside the repository tubular chambers, according to some embodiments of the present invention.

Optionally, repository tubular chambers 102 and/or repository tubular pistons 103 include sharp tip(s) for penetrating a substance bag located inside repository tubular chambers 102. Reference is now made to FIG. 16, which is a cross section drawing of a capsule having sharp tips inside the repository tubular chambers, according to some embodiments of the present invention. When repository tubular pistons 103 are pushed, sharp tips 162 of repository tubular chambers 102 and sharp tip 163 of repository tubular pistons 103 are creating holes in substance bag 161 located inside repository tubular chambers 102. The substance bag 161 allows better isolation of active materials, for example to prevent them from interacting with the material of the capsule during storage. The substance bag 161 may be of tubular shape to fit inside repository tubular chambers 102, and may be made, for example, from foil, plastic, nylon and/or any other material which is not interacting with the substance stored inside the substance bag 161.

Optionally, repository tubular pistons 103 are held in position inside the repository tubular chambers 102, to prevent substance from main chamber 101 to return to the repository tubular chambers 102.

Figure 17B:
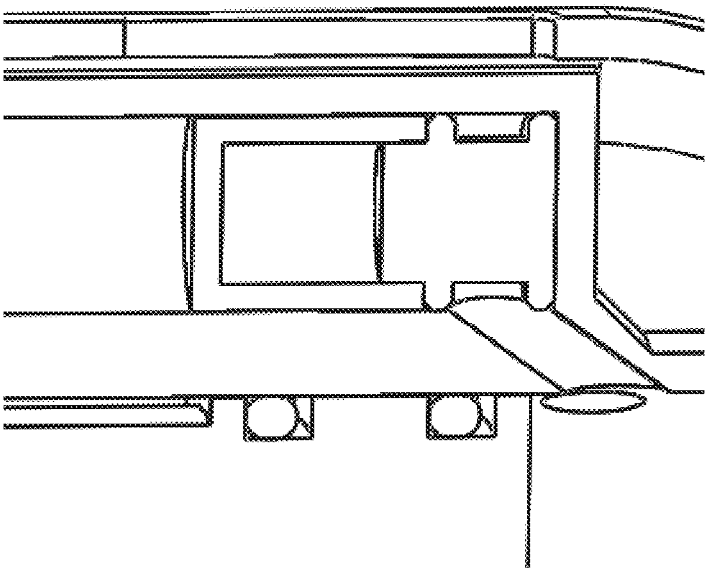
FIGS. 17A and 17B are cross section drawing and an enlarged view of the cross section drawing, respectively, of a capsule having repository tubular pistons held in position by friction, according to some embodiments of the present invention.
Figure 17A:
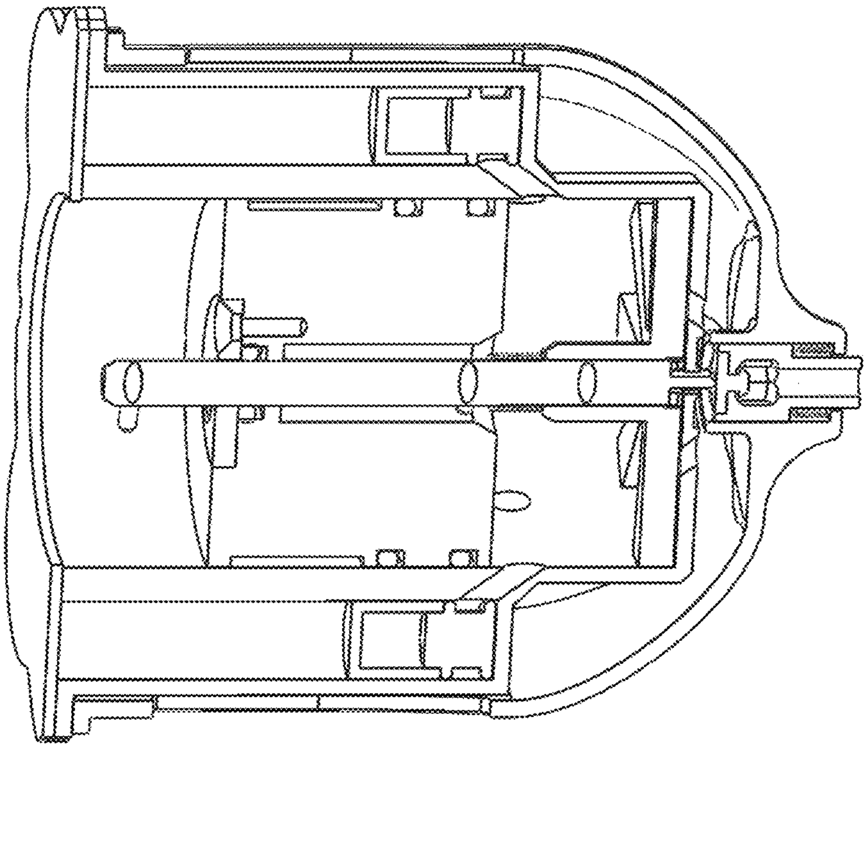

Reference is now made to FIGS. 17A and 17B, which are cross section drawing and an enlarged view of the cross section drawing, respectively, of a capsule having repository tubular pistons held in position by friction, according to some embodiments of the present invention.

Figure 18B:
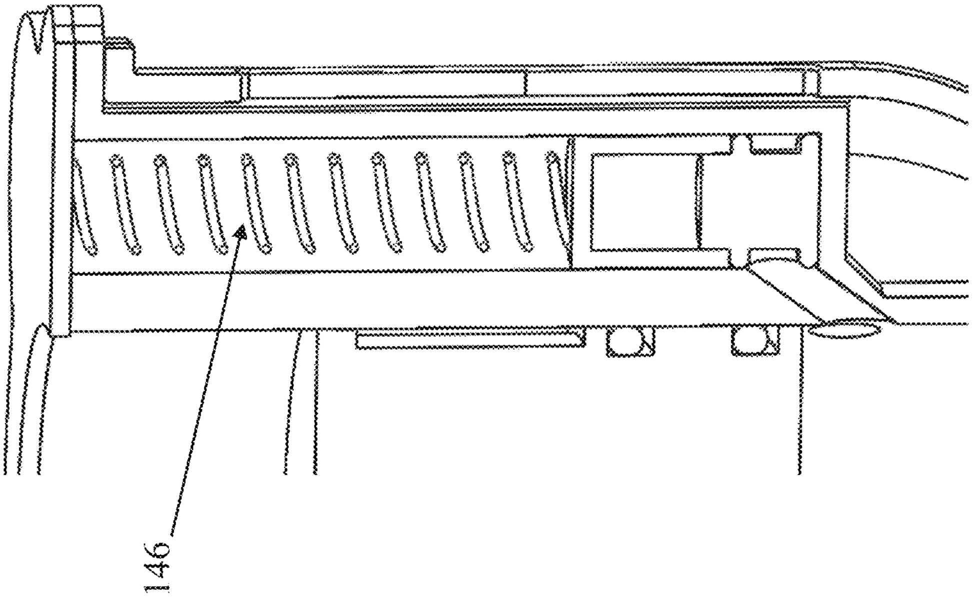
FIGS. 18A and 18B are cross section drawing and an enlarged view of the cross section drawing, respectively, of a capsule having repository tubular pistons held in position by a spring, according to some embodiments of the present invention.
Figure 18A:
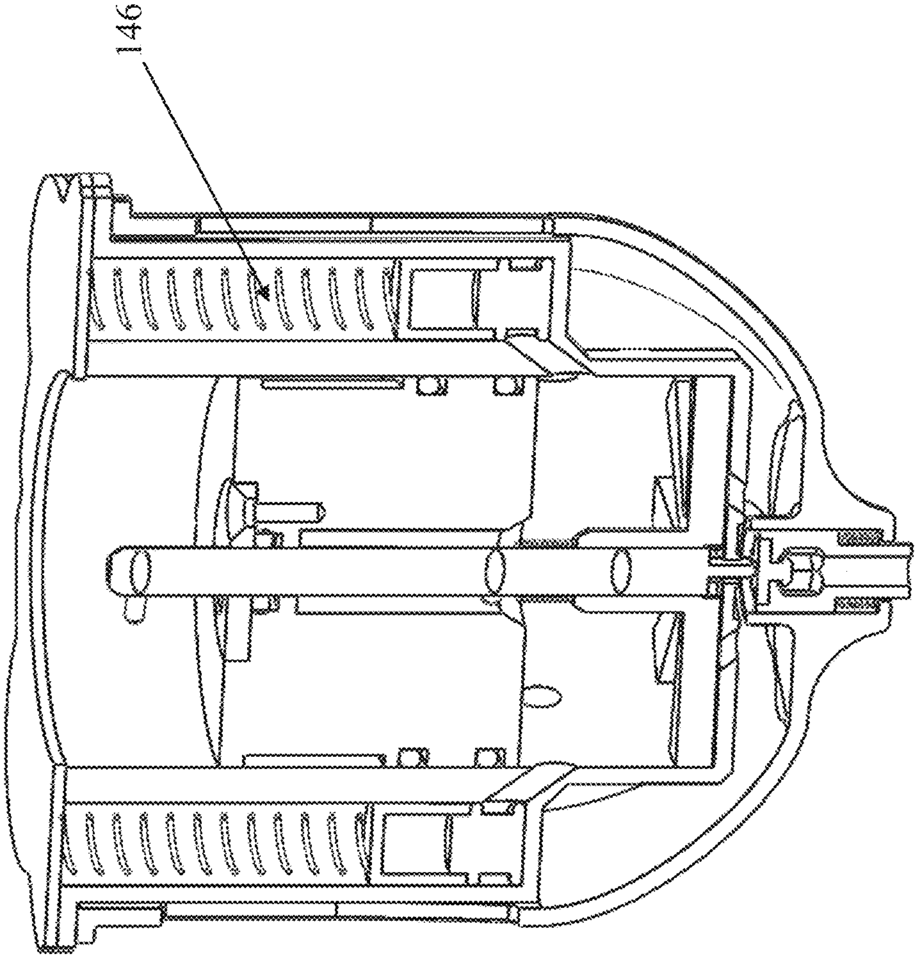

Reference is now made to FIGS. 18A and 18B, which are cross section drawing and an enlarged view of the cross section drawing, respectively, of a capsule having repository tubular pistons held in position by a spring, according to some embodiments of the present invention. This mechanism may be included in one or more of the repository tubular chambers 102. Optionally, a spring 146 pushes the repository tubular piston 103 downward to extract a substance from the repository tubular chamber 102. Optionally, a spring 146 also pushes the repository tubular piston 103 downward to hold the repository tubular piston 103 in position, and optionally seal passage 104 to prevent the substance from returning to the repository tubular chamber 102.

Figure 19B:
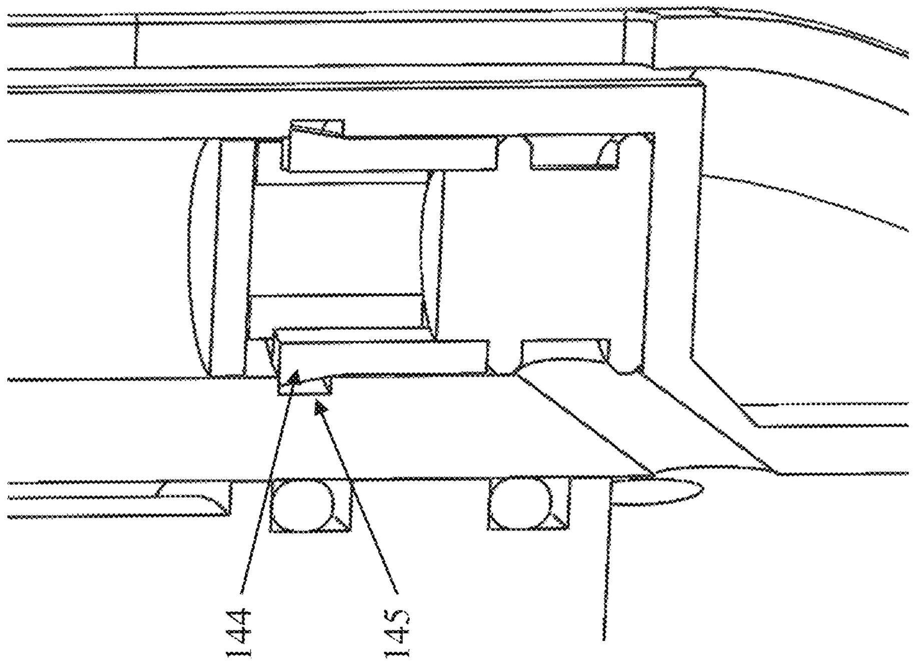
FIGS. 19A and 19B are cross section drawing and an enlarged view of the cross section drawing, respectively, of a capsule having repository tubular pistons held in position by locking teeth, according to some embodiments of the present invention.
Figure 19A:
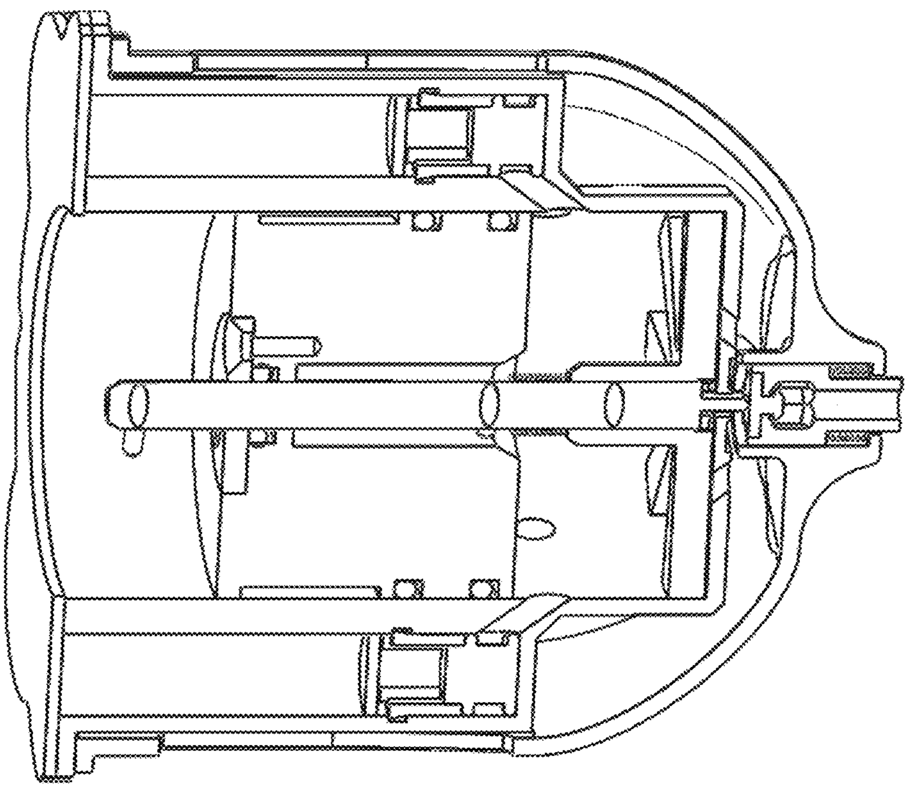

Reference is now made to FIGS. 19A and 19B, which are cross section drawing and an enlarged view of the cross section drawing, respectively, of a capsule having repository tubular pistons held in position by locking teeth, according to some embodiments of the present invention. This mechanism may be included in one or more of the repository tubular cambers 102. Optionally, repository tubular pistons 103 includes one or more locking teeth 144, and repository tubular chambers 102 include one or more matching notches 145. Teeth 144 are inserted into notches 145 when the repository tubular piston 103 is at a downward position, to hold the repository tubular piston 103 in position. Optionally, repository tubular chambers 102 include multiple notches 145 at different locations along repository tubular chambers 102, to allow locking teeth 144 to hold the repository tubular piston 103 in different positions along repository tubular chambers 102, for example when only some of the substance from a repository tubular chamber 102 is extracted into main chamber 101.

Figure 9E:
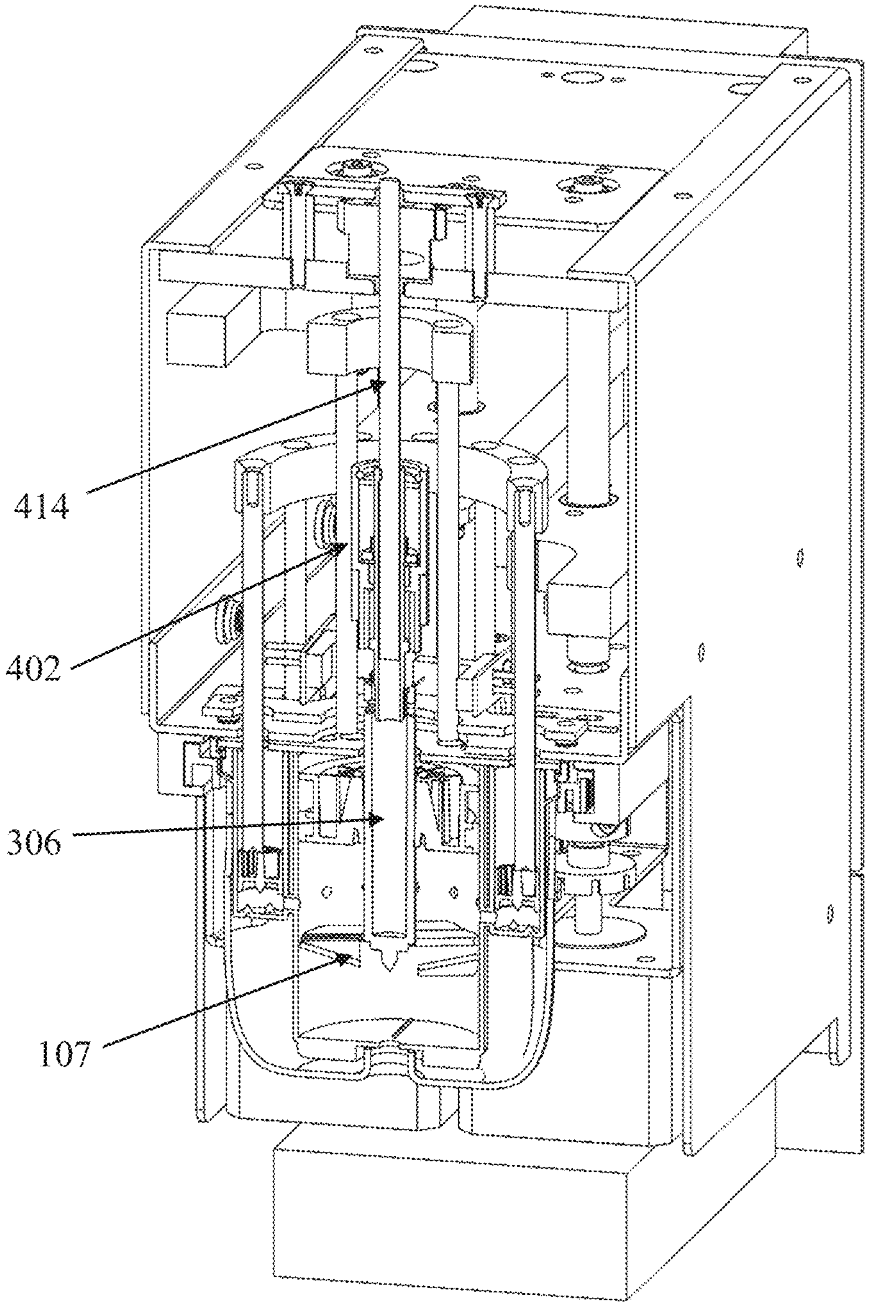

Then, as shown at 504 and FIG. 9E, (when the main piston is in outward position) mixer rod 306 is rotated to operate mixer element 107. Mixer rod 306 is rotated by torque element 402 via piston 403. Torque element 402 is rotated by torque rod 414, which is operated by an engine 405 (shown at FIG. 7A). Torque rod 414 is inserted into torque element 402 (and optionally into piston 403), so torque element 402 (and optionally into piston 403) may be moved upwards and downwards.

Figure 9F:
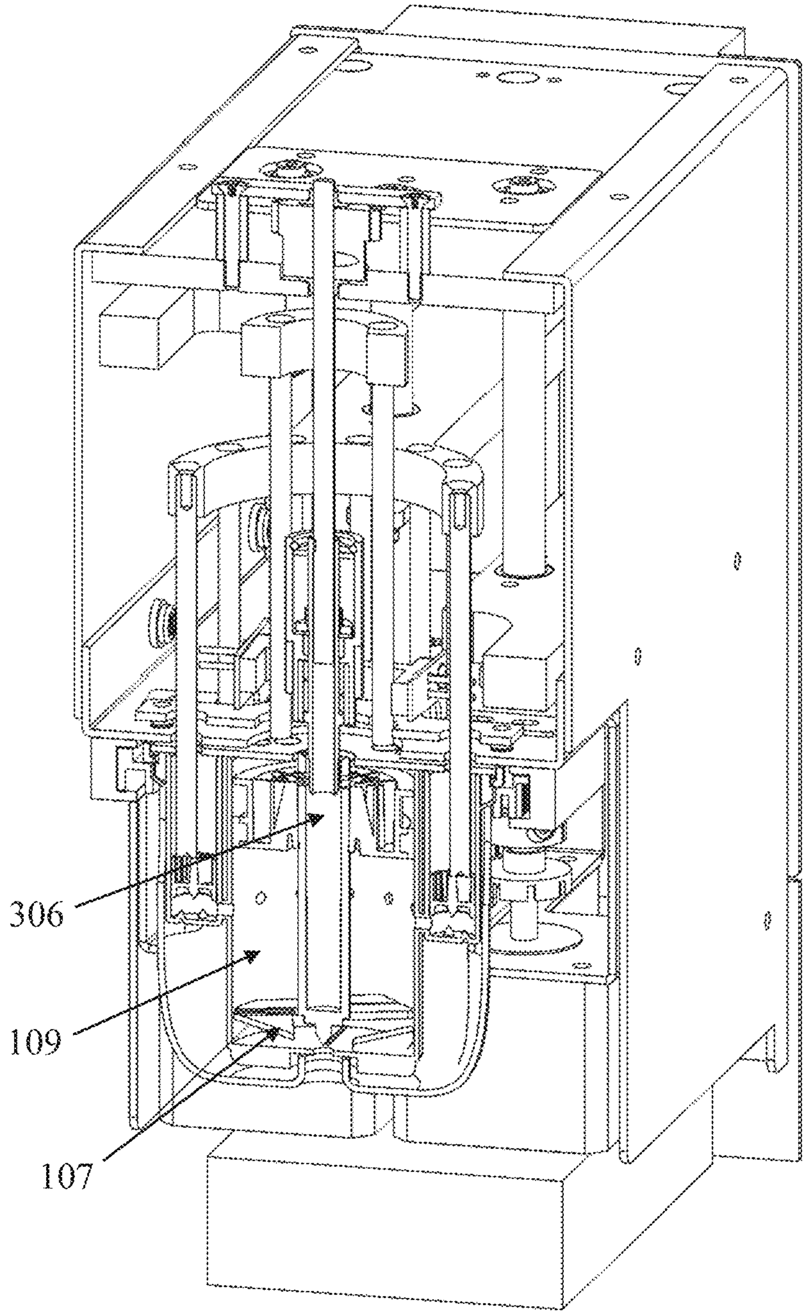

Optionally, as shown at 505 and FIG. 9F, while mixer rod 306 is rotated, mixer rod 306 is pulled and pushed to move mixer element 107 inside inner chamber 109.

Figure 20A:
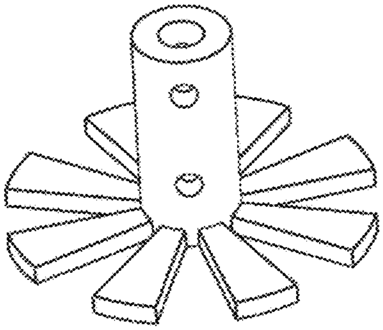
FIGS. 20A, 20B and 20C are drawings of different shapes of mixer elements, according to some embodiments of the present invention.
Figure 20B:
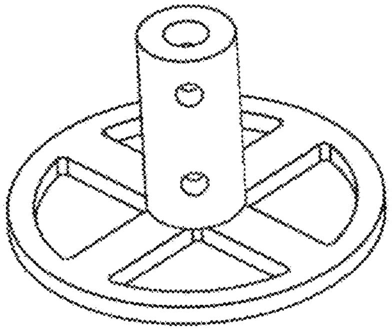
Figure 20C:
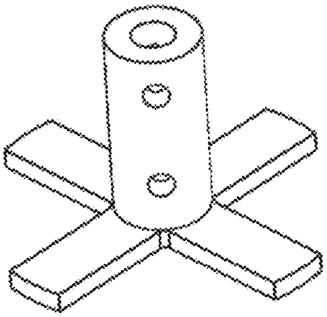
Figure 21A:
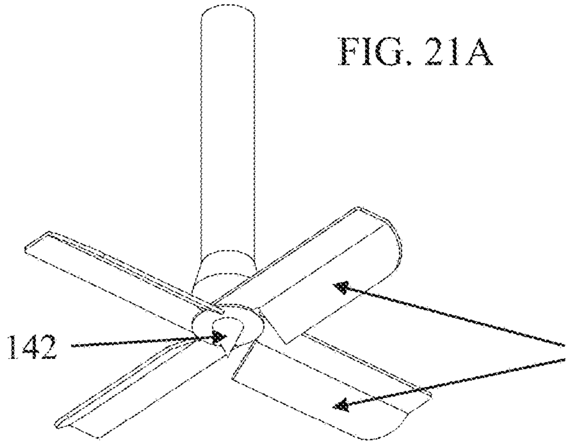
FIGS. 21A, 21B, 21C and 21D are drawings of a mixer element in different views and orientations, according to some embodiments of the present invention.
Figure 21C:
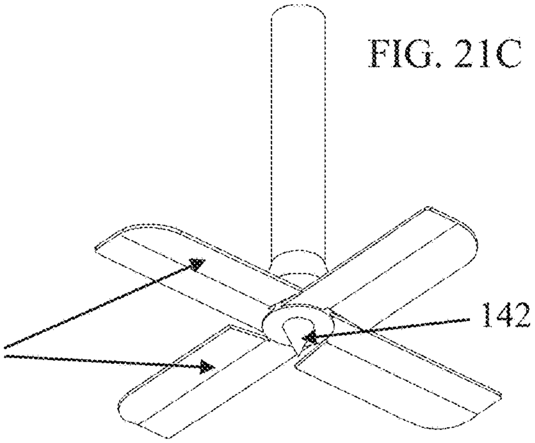
Figure 21B:
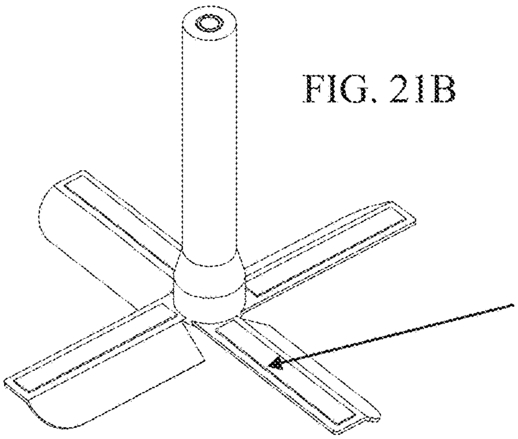
Figure 21D:
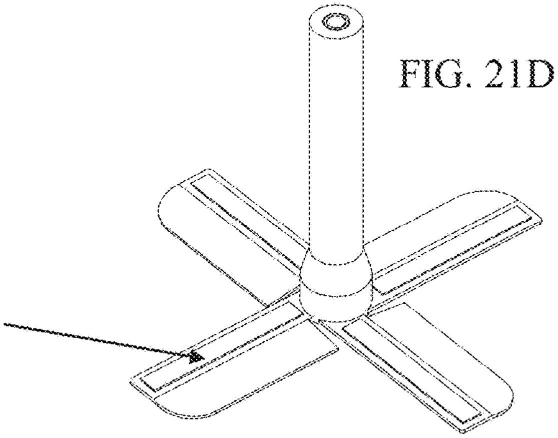

Mixer element 107 may be of any shape or type. Reference is now made to FIGS. 20A, 20B and 20C, which are drawings of different shapes of mixer elements, according to some embodiments of the present invention. Different preparation types (made of liquids or liquids and powder) that are mixed inside the main chamber have different viscosity behavior and stickiness level. For example, hair color preparation is much easier to be mixed effectively than many kinds of creams, which their ingredients have higher viscosity level. The same is true for syrups of nutritional supplements and/or food additives that some of their ingredients are relatively sticky due to use of more adhesive ingredients types. The choice of mixer elements type and blades width is influenced by the type of preparation ingredients to achieve effective process (homogeneous preparation and quick mixing).

Reference is now made to FIGS. 21A, 21B, 21C and 21D, which are drawings of a mixer element in different views and orientations, according to some embodiments of the present invention.

Optionally, the blades of mixer element 107 include heating surfaces 141, which are heating the preparation mixture in main chamber 101 while mixing. Some preparations (for example special creams made of raw materials) are better prepared when the mixture is at a high temperature. The heating may be, for example, for up to 50°-80° Celsius, depending on mixture type and requirements. Optionally, heating surfaces 141 are powered by electricity provided from device 200 via torque adapter 108 and through mixer rod 106.

Then, optionally, as shown at 506, a main chamber bottom opening 113 in main chamber bottom 111 is opened to allow the mixture to exit from inner chamber 109.

Figure 9G:
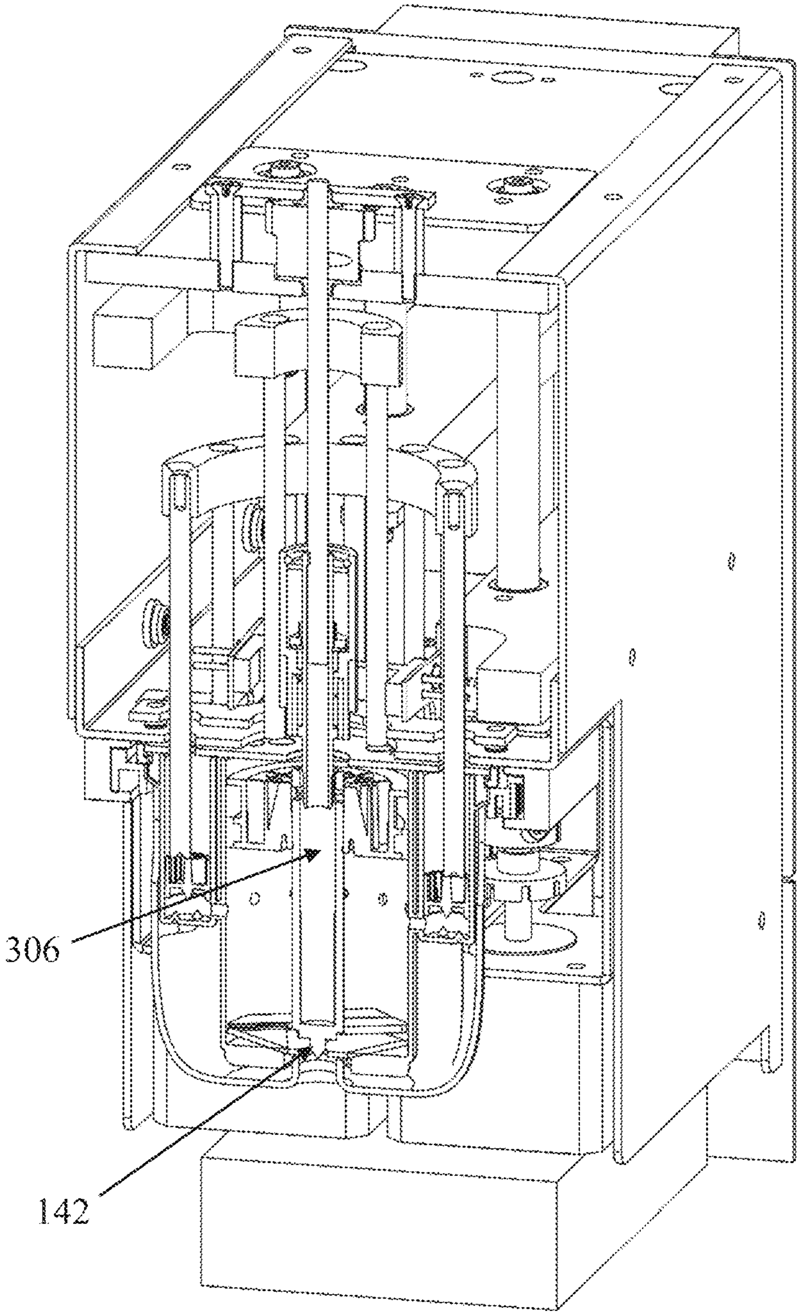

Optionally, main chamber bottom 111 includes a membrane which seals main chamber bottom opening 113. Optionally, mixer rod 106 includes a sharp tip 142 at the distal end. Optionally, as shown at FIG. 9G, mixer rod 306 is pushed downwards so the membrane is punctured by sharp tip 142.

Optionally, mixer element 107 includes flexible blades which include a flexible part 143. Since main chamber bottom 111 may be penetrated by sharp tip 142 by a pressing force before mixture dispensing, the flexible blades may prevent the "dead-zones" inside main chamber 101 around sharp tip 142 where unmixed raw-materials may stick together. Flexible part 143 has a foldable mechanical connection that is connecting flexible part 143 to the rigid part of the blade. When pressing mixer rod 106 from top down, both of two parts are merging to same surface-level. Optionally and alternatively, main chamber bottom opening 113 is sealed by a bottom piston. Optionally, mixer rod 106 is pushed downwards to push the bottom piston downward by the distal end of mixer rod 106, and partially open main chamber bottom opening 113.

Figure 22:
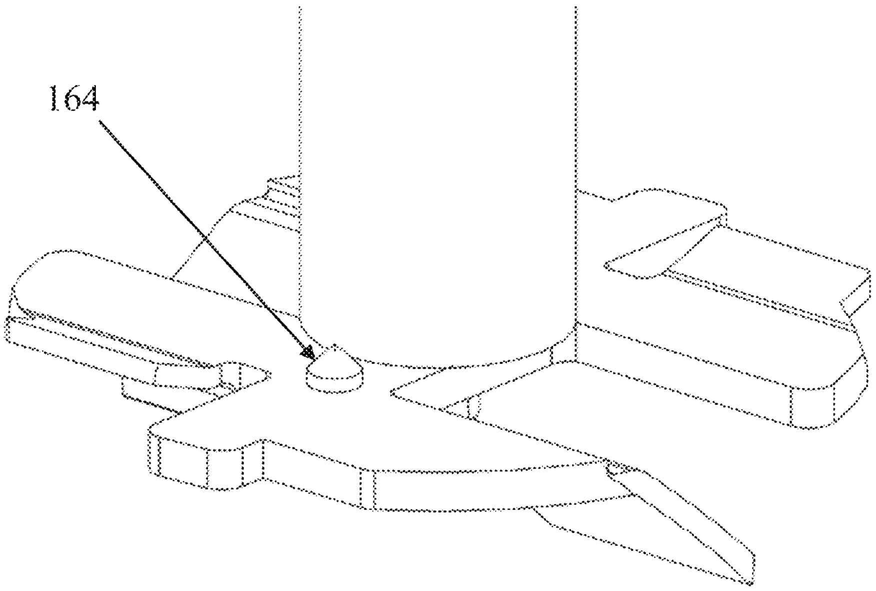
FIG. 22 is a drawing of a mixer element having a top sharp tip, according to some embodiments of the present invention.

Optionally, mixer element 107 includes a top sharp tip 164, for penetrating a substance bag located inside main chamber 101. Reference is now made to FIG. 22, which is a drawing of a mixer element having a top sharp tip, according to some embodiments of the present invention. The substance bag allows better isolation of active materials, as described above. The substance bag may be located between main piston 105 and mixer element 107, and may have a donut shape around mixer rod 306 (or 106). The top sharp tip 164 may penetrate the substance bag when mixer rod 106 306 is pulled, so mixer element 107 is pushing the substance bag and then main piston 105 upward.

Figure 23A:
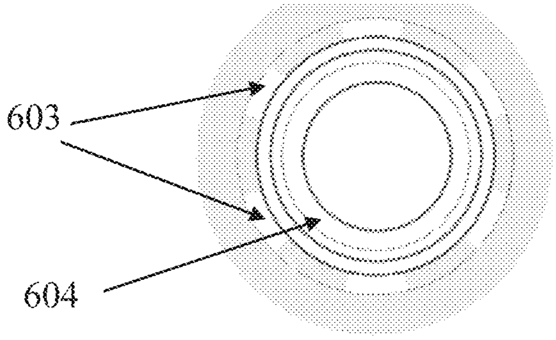
FIGS. 23A, 23B and 23C are schematic drawings of a bottom view, a side view and a cross section view, respectively, of a frame for a bottom piston, according to some embodiments of the present invention.
Figure 23B:
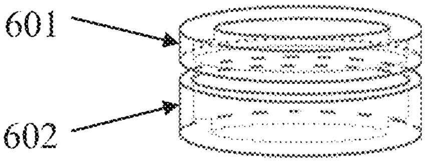
Figure 23C:
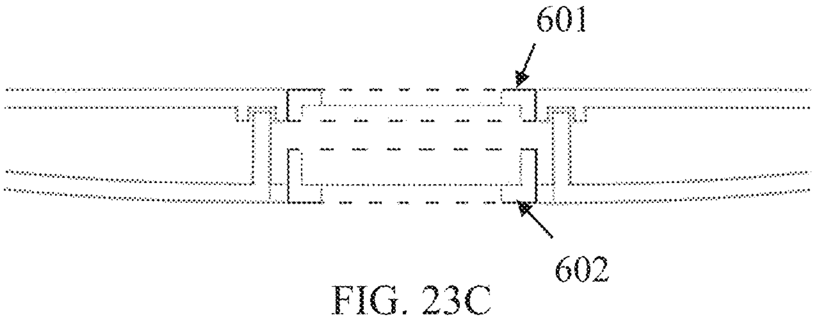

Reference is now made to FIGS. 23A, 23B and 23C, which are schematic drawings of a bottom view, a side view and a cross section view, respectively, of a frame for a bottom piston, according to some embodiments of the present invention. The frame is made of two parts of the body of a capsule, top part 601 and bottom part 602, creating a circular space for the bottom piston. The frame includes bottom openings 603 in bottom part 602 arranged around the circular opening.

Figure 23D:
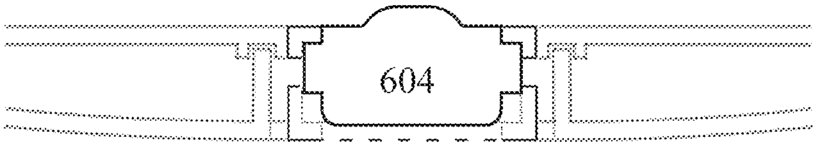
FIGS. 23D and 23E are schematic drawings of a cross section view of a frame for a bottom piston and a bottom piston in two positions, according to some embodiments of the present invention.
Figure 23E:
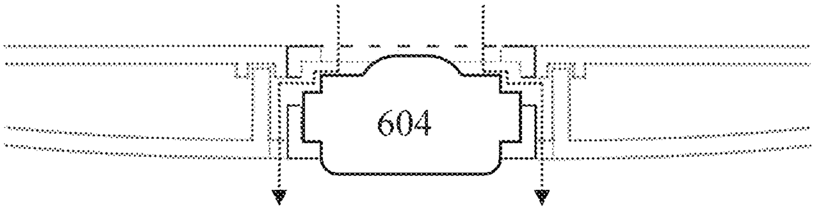

Reference is also made to FIGS. 23D and 23E, which are schematic drawings of a cross section view of a frame for a bottom piston and a bottom piston in two positions, according to some embodiments of the present invention. FIG. 23D shows bottom piston 604 at a sealed position, adjacent to top part 601. At this state, bottom piston 604 is sealing main chamber 101. When bottom piston 604 is pushed downward by the mixer rod of the capsule, as shown at FIG. 23E, bottom piston 604 is adjacent to bottom part 602. At this state, bottom channels are created around bottom piston 604 by bottom openings 603, through which substance may be extracted from the main chamber of the capsule.

Figure 24A:
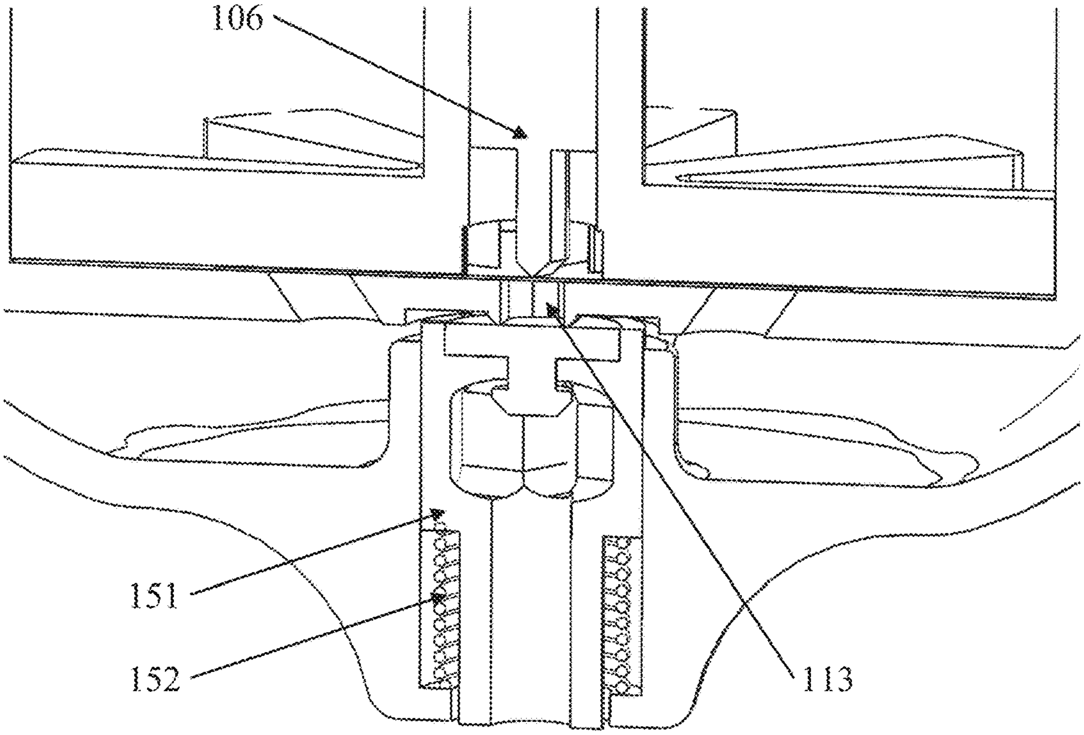
FIGS. 24A, 24B and 24C are cross section drawings of a lower part of a capsule having a bottom piston, according to some embodiments of the present invention.
Figure 24B:
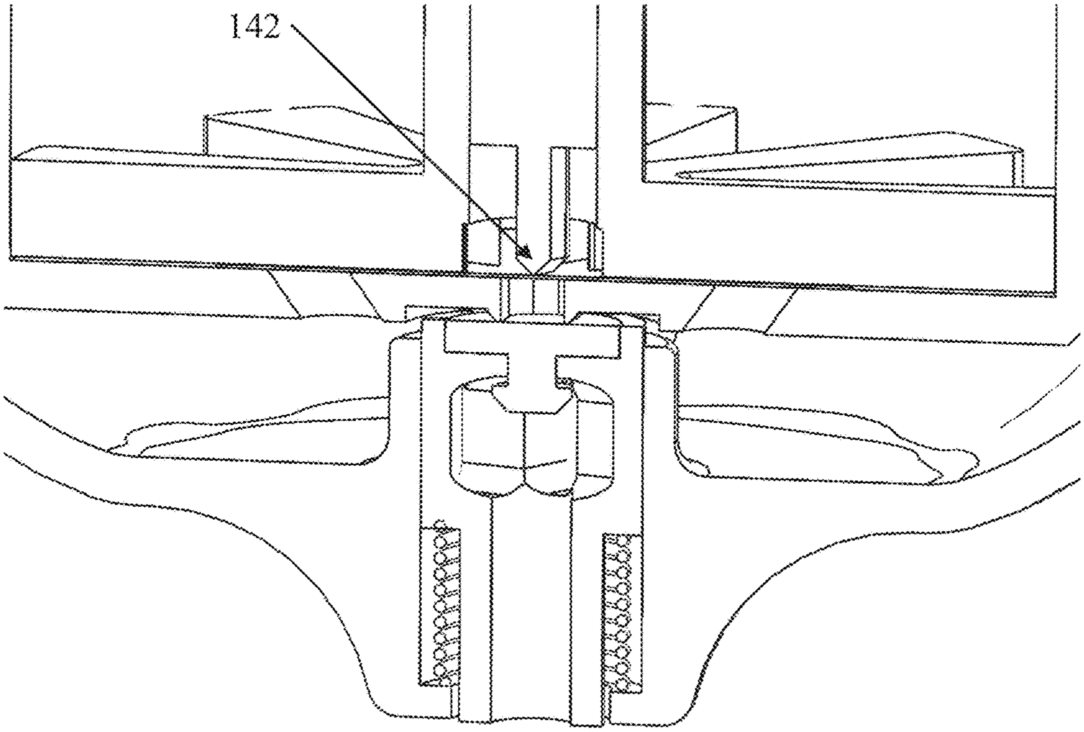
Figure 24C:
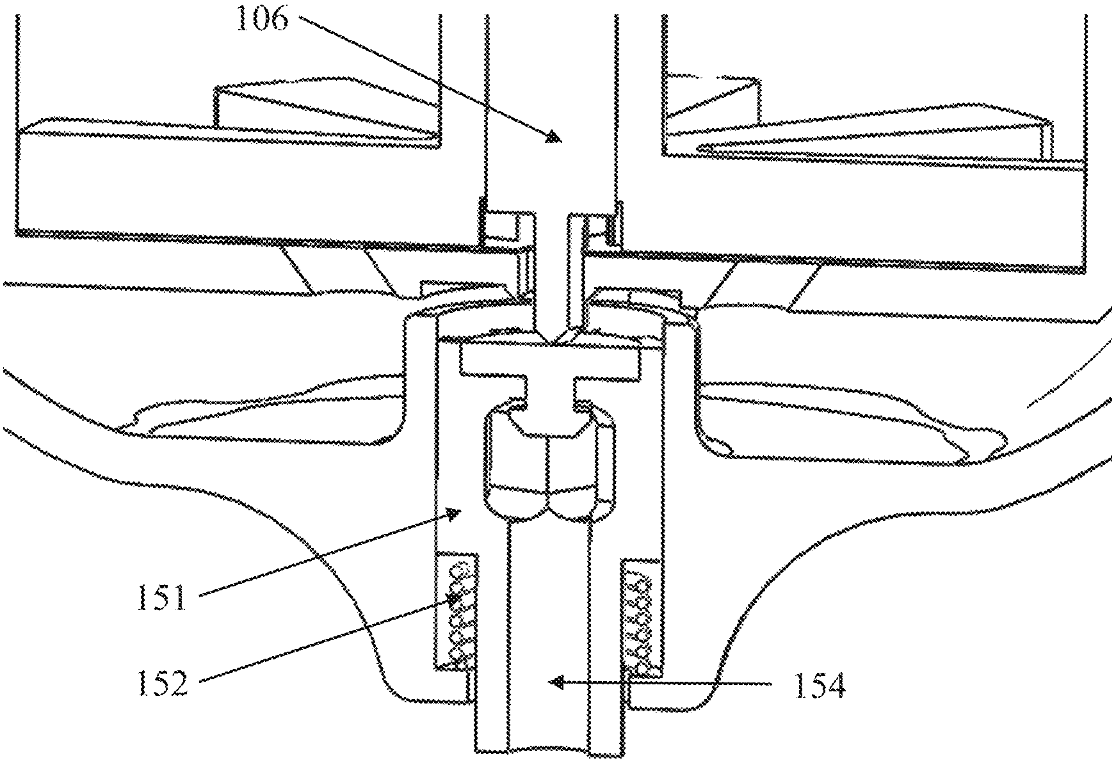
Figure 24D:
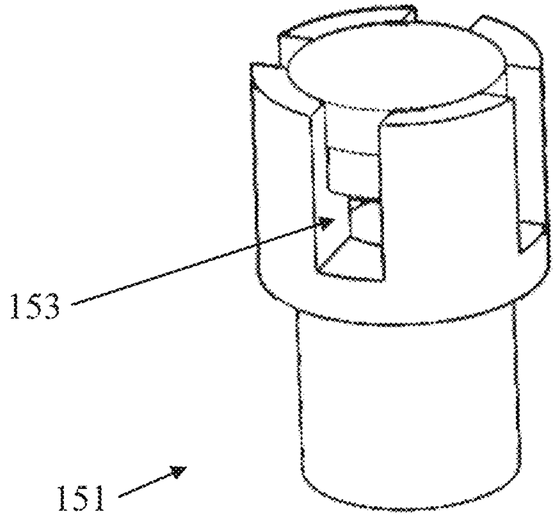
FIG. 24D is a drawing of the bottom piston of FIG. 24A, according to some embodiments of the present invention.

Reference is also made to FIGS. 24A, 24B and 24C, which are cross section drawings of a lower part of a capsule having a bottom piston mechanism, according to some embodiments of the present invention. Reference is also made to FIG. 24D, which is a drawing of the bottom piston of FIG. 24A, according to some embodiments of the present invention. A bottom piston 151 is sealing main chamber bottom opening 113, as shown in FIG. 24A. Optionally, main chamber bottom opening 113 is sealed with a membrane, which is punctured by sharp tip 142, as shown in FIG. 24B. Then, as shown in FIG. 24C, bottom piston 151 is pushed by the distal end of mixer rod 106. Optionally, bottom piston 151 is pushed downward against a spring 152. At this state, bottom channels 153 of bottom piston 151 are opened, through which substance may be extracted from main chamber 101. The substance passes through bottom channels 153 and then through a middle bottom channel 154 of bottom piston 151.

Figure 9H:
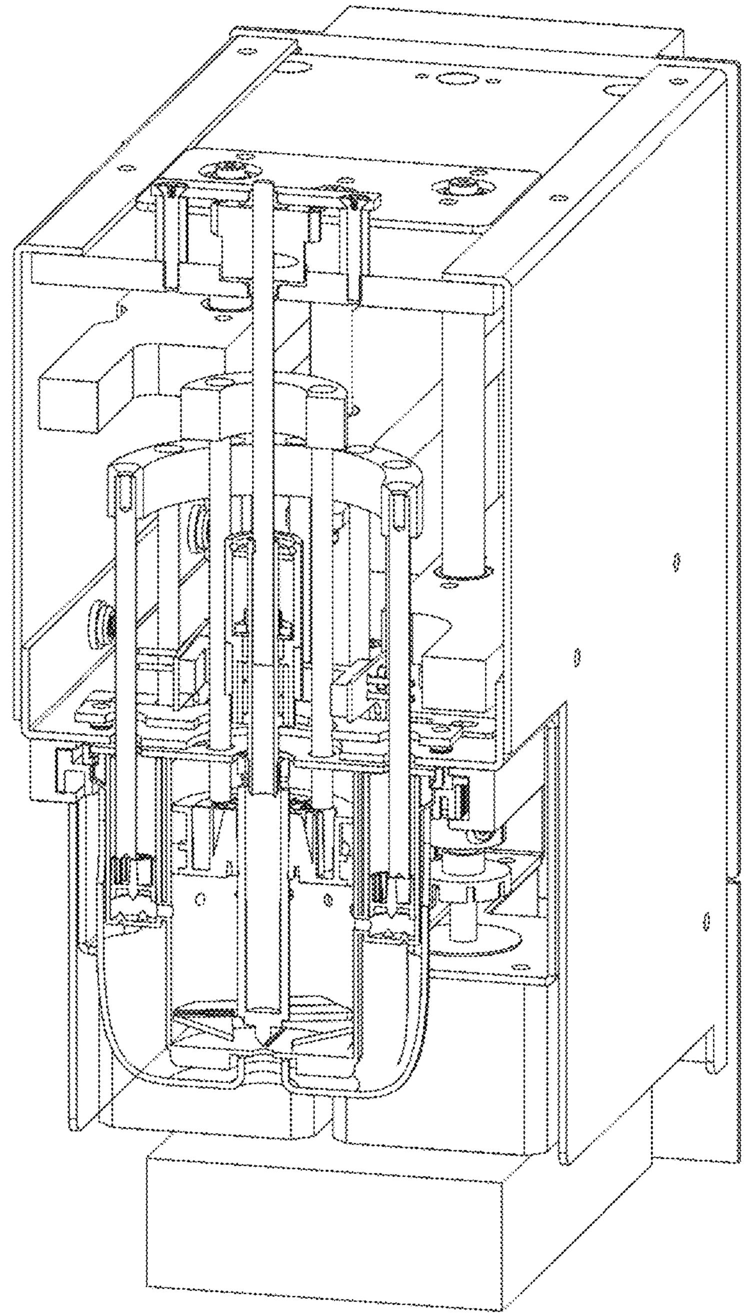
Figure 9I:
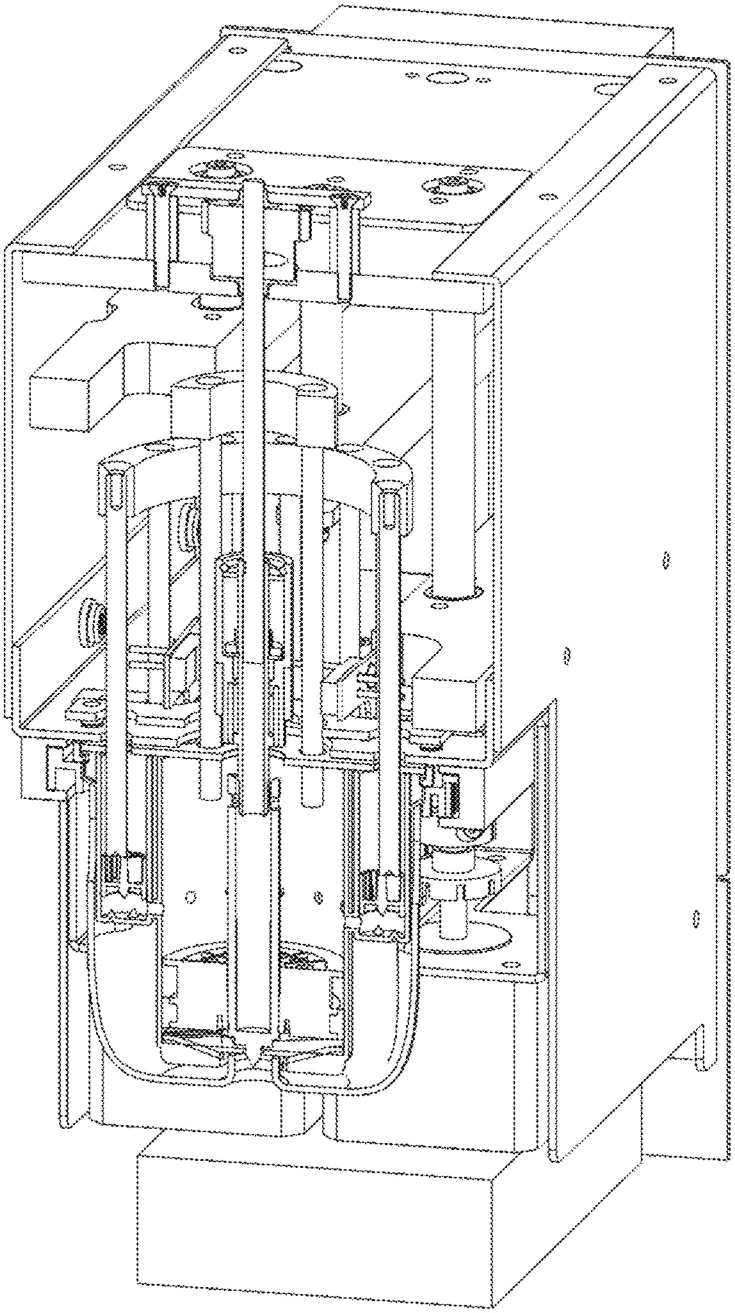

Then, optionally, as shown at 507 and at FIGS. 9H and 9I, main piston 105 is pushed towards main chamber bottom 111 to extract the mixture (the mixed substances) from inner chamber 109 via main chamber bottom opening 113 to be used by a user. Optionally, main piston 105 is pushed by one or more main pushing rods 410 (or main pushing rod 210 of device 200).

Finally, optionally, as shown at 508, main piston 105 returns to its initial position and seals passages 104 so ingredients remain clean and unexposed to air and other ingredients. This allows another mixing process to begin using the ingredients left in repository tubular chambers 102.

Optionally, when main chamber bottom opening 113 is initially sealed by a bottom piston 151, the user may re-seal chamber bottom opening 113 by pushing bottom piston 151 upward. Optionally, when mixer rod 106 (or 306) is moved upward, spring 152 is pushing bottom piston 151 upward to re-seal chamber bottom opening 113.

Optionally, mixer rod 306 is released from torque element 402 by a reversed turn of torque element 402 (compared to the direction of turn for mixing) by the motor, thus moving pins 413 out of slots 308 of mixer rod 306.

Figure 25A:
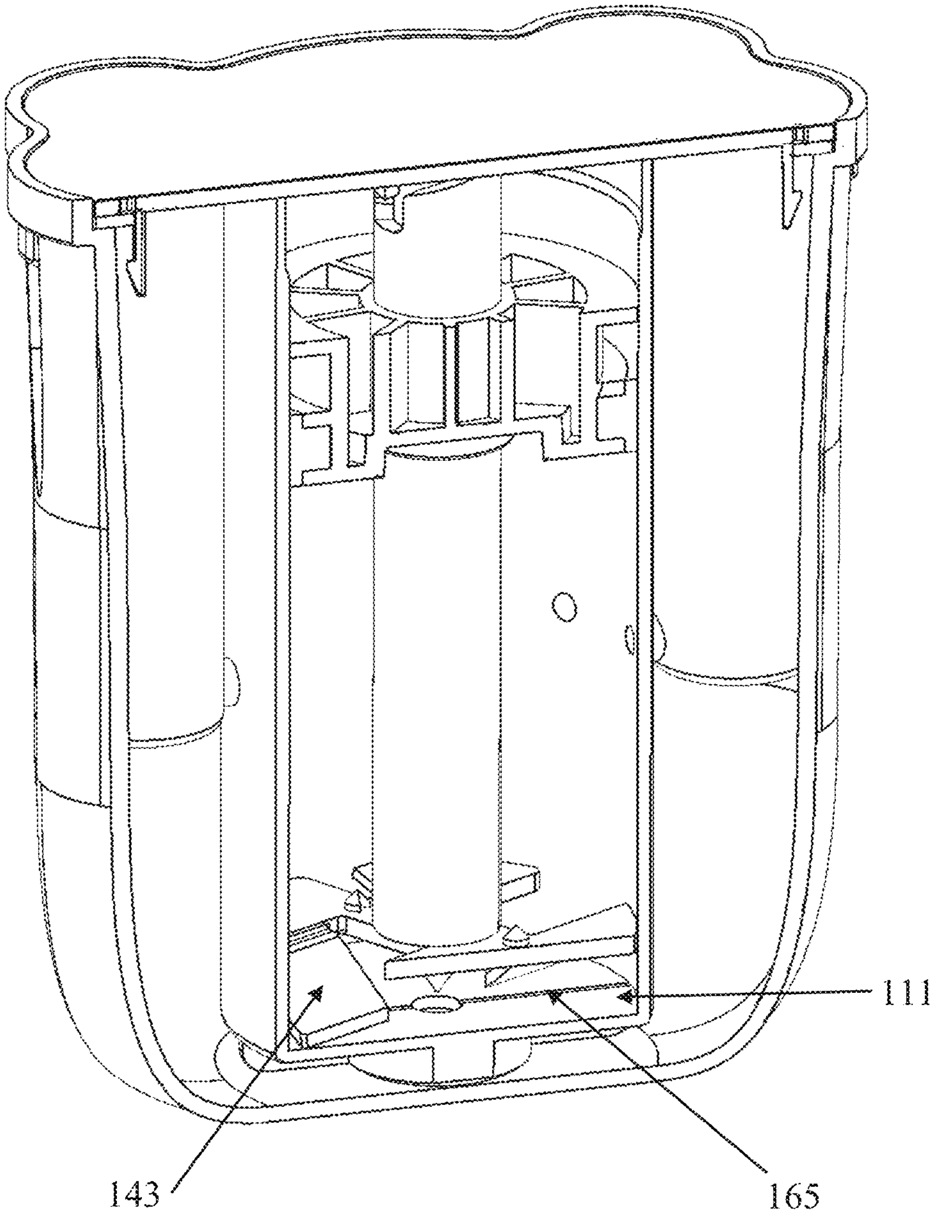
FIG. 25A is a cross section drawing of a capsule having bottom slots for forced reverse release, according to some embodiments of the present invention.
Figure 25B:
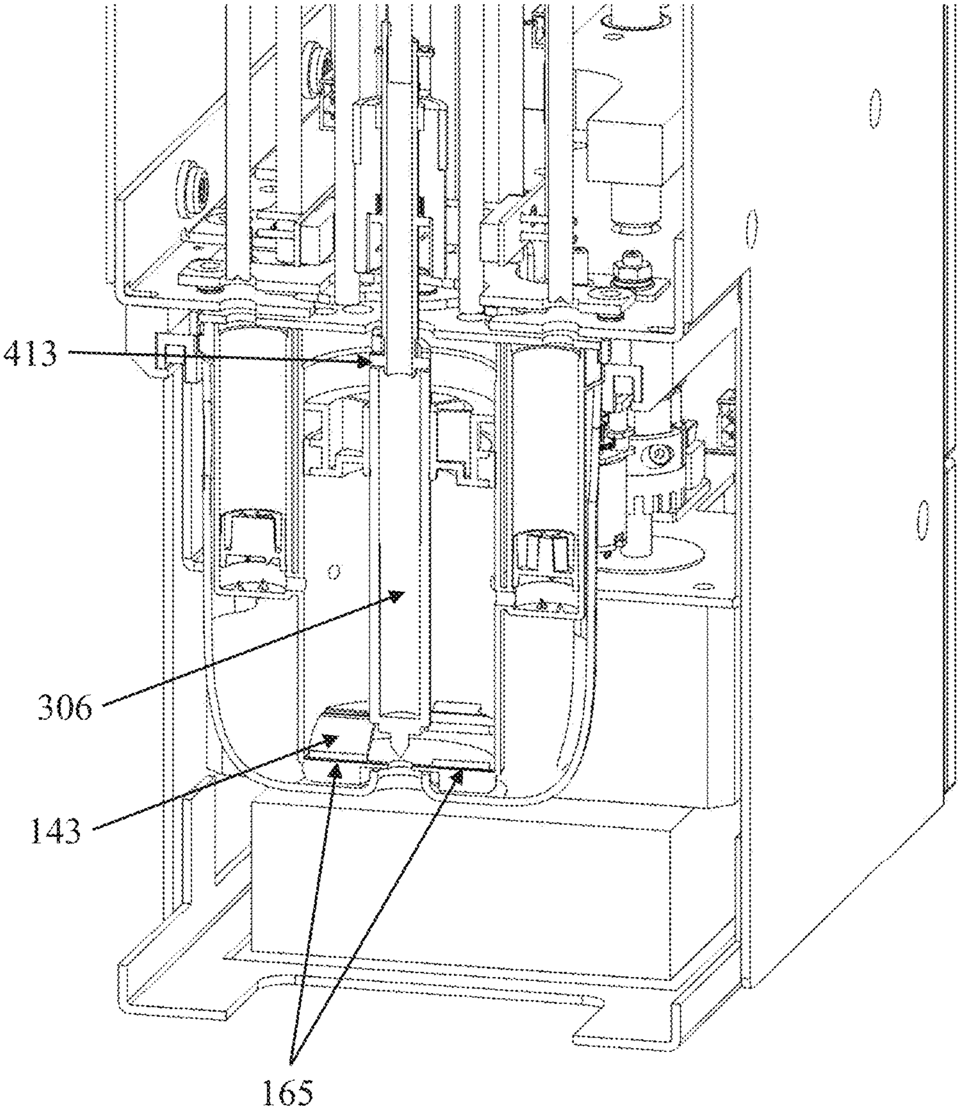
FIGS. 25B and 25C are cross section drawings of a device with capsule at different stages of a forced reverse release, according to some embodiments of the present invention.
Figure 25C:
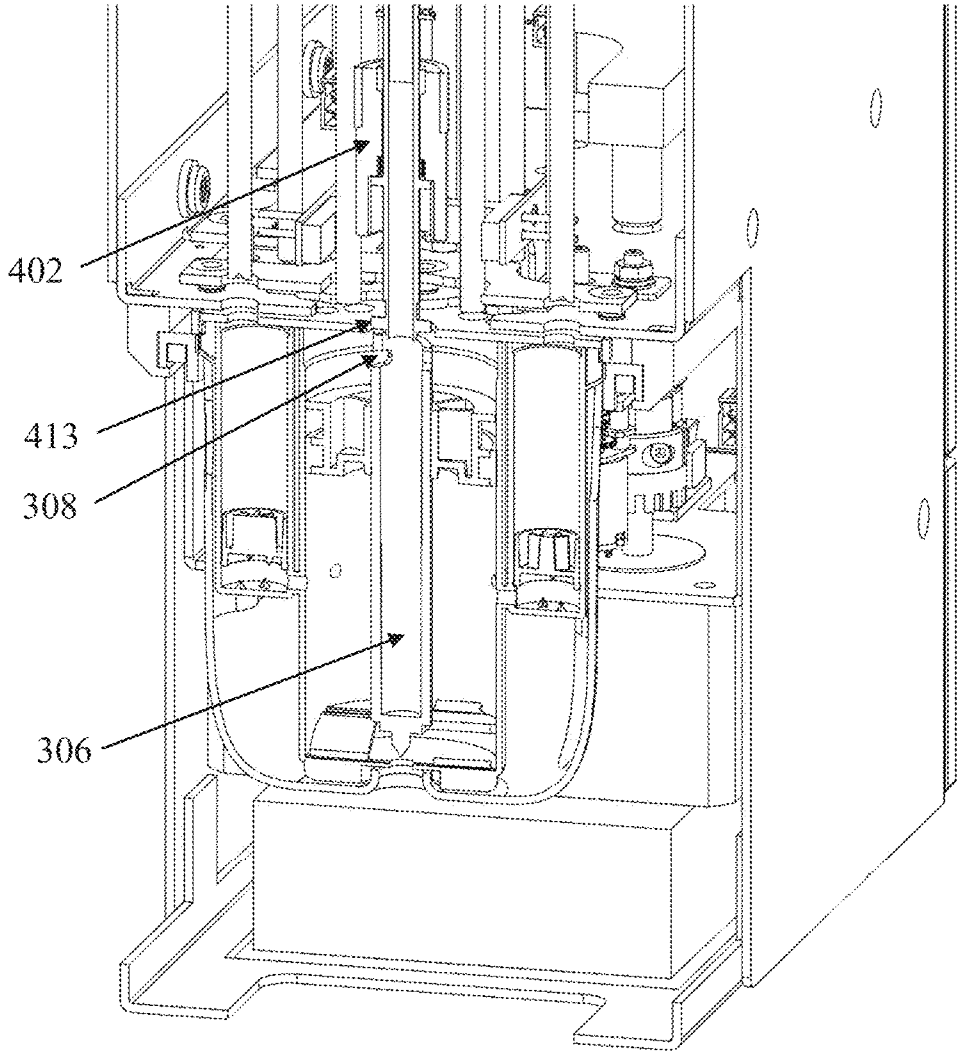

Reference is now made to FIG. 25A, which is a cross section drawing of a capsule having bottom slots for forced reverse release, according to some embodiments of the present invention. Reference is also made to FIGS. 25B and 25C, which are cross section drawings of a device with capsule at different stages of a forced reverse release, according to some embodiments of the present invention. In case of a malfunction or obstruction in the device that prevents the pins 413 from moving out of slots 308, a mechanism is suggested that releases mixer rod 306 from torque element 402 by force, so the capsule may be removed. The capsule 300 includes one or more bottom slots 165 located at the main chamber bottom 111 (also shown in FIG. 9B). When needed, mixer rod 306 is moved downward and mixer element 107 are turned in a reversed direction (compared to the direction of turn for mixing), so that flexible part 143 (blades, and/or any other part of mixer element 107) is locked inside the bottom slots 165 (as shown at FIG. 25B). Then, when mixer rod 306 continues to turn in the reversed direction, a force is applied on pins 413 and pulls them out of slots 308. Mixer rod 306 is then released from torque element 402, as shown at FIG. 25C.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant capsules will be developed and the scope of the term capsule is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A capsule configured for removable placement in a device configured for mixing multiple substances within the capsule, comprising:

a main chamber having a main chamber bottom and a main chamber top opening;

at least two repository tubular chambers, each:

(1) adapted to contain substance, (2) arranged in parallel to the main chamber and arranged in a circumferential around an outer lateral side wall of the main chamber, and (3) having a repository tubular chamber top opening adapted to be sealed with a tubular piston;

at least two passages, each fluidly connecting one of the at least two repository tubular chambers to the main chamber;

a main piston fitted in the main chamber; and a mixer rod having a mixer element disposed at a distal end;

a torque adapter disposed at a proximal end for transferring a torque to rotate the mixer element in the main chamber, the mixer rod is fitted to pass along the main piston such that the mixer element is mounted in the main chamber between the main chamber bottom and a distal end of the main piston when the main piston is in an outward position;

wherein a side wall of the main piston is sealing the at least two passages in an inward position and opens the at least two passages when being moved along the main chamber to the outward position.

2. The capsule of claim 1, wherein the at least two repository tubular chambers are peripheral to the main chamber in a circumferential arrangement around the outer wall of the main chamber.

3. The capsule of claim 1, further comprising windows located on repository tubular chambers for external view of the ingredients before preparation.

4. The capsule of claim 3, wherein the windows are made of a transparent material.

5. The capsule of claim 4, wherein the transparent material is for raw materials and vitamins which are sensitive to light-exposure.

6. The capsule of claim 1, further comprising an inner chamber of the main chamber to extract substances from repository tubular chambers via passages into the inner chamber.

7. The capsule of claim 6, Further comprising a cylindrical body to mount windows thereon and to ingest the at least two repository tubular chambers.

8. The capsule of claim 1, further comprising an inner chamber of the main chamber to extract substances from repository tubular chambers via passages into the inner chamber.

9. The capsule of claim 8, wherein the at least two repository tubular chambers are peripheral to the main chamber.

10. The capsule of claim 1, wherein the main chamber is formed in a body of the capsule; wherein the body of the capsule having a flange that is expanded around lateral walls of the body of the capsule.

* * * * *